US008148472B1

(12) United States Patent
Baugh et al.

(10) Patent No.: US 8,148,472 B1
(45) Date of Patent: *Apr. 3, 2012

(54) POLYMER COMPOSITIONS COMPRISING CYCLIC OLEFIN POLYMERS, POLYOLEFIN MODIFIERS AND NON-FUNCTIONALIZED PLASTICIZERS

(75) Inventors: Lisa Saunders Baugh, Ringoes, NJ (US); Bryan R. Chapman, Annandale, NJ (US); Enock Berluche, Phillipsburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1051 days.

This patent is subject to a terminal disclaimer.

(21) Appl. No.: 12/012,380

(22) Filed: Feb. 1, 2008

Related U.S. Application Data

(63) Continuation-in-part of application No. 11/820,739, filed on Jun. 20, 2007, which is a continuation-in-part of application No. PCT/US2007/014381, filed on Jun. 20, 2007.

(60) Provisional application No. 60/835,524, filed on Aug. 4, 2006, provisional application No. 60/836,007, filed on Aug. 7, 2006.

(51) Int. Cl.
*C08L 45/00* (2006.01)
*C08L 23/00* (2006.01)
*C08L 23/04* (2006.01)
*C08F 8/00* (2006.01)

(52) U.S. Cl. ........ 525/211; 525/210; 525/191; 525/240; 524/490

(58) Field of Classification Search ............... 525/240, 525/210, 211, 191
See application file for complete search history.

(56) References Cited

U.S. PATENT DOCUMENTS

| | | | |
|---|---|---|---|
| 2,799,668 A | 7/1957 | Anderson et al. | |
| 2,883,372 A | 4/1959 | Stamatoff | |
| 3,494,897 A | 2/1970 | Reding et al. | |
| 4,504,604 A | 3/1985 | Pilkington et al. | |
| 4,614,778 A | 9/1986 | Kajiura et al. | |
| 4,835,218 A | 5/1989 | Yoshimura et al. | |
| 4,874,808 A | 10/1989 | Minami et al. | |
| 4,918,133 A | 4/1990 | Moriya et al. | |
| 4,992,511 A * | 2/1991 | Yamamoto et al. | 525/97 |
| 5,087,677 A | 2/1992 | Brekner et al. | |
| 5,218,049 A * | 6/1993 | Yamamoto et al. | 525/97 |
| 5,250,628 A | 10/1993 | Seguela et al. | |
| 5,312,856 A | 5/1994 | Hert et al. | |
| 5,324,801 A | 6/1994 | Brekner | |
| 5,359,001 A | 10/1994 | Epple et al. | |
| 5,428,098 A | 6/1995 | Brekner et al. | |
| 5,573,717 A | 11/1996 | Peiffer et al. | |
| 5,574,100 A | 11/1996 | Sagane et al. | |
| 5,753,755 A | 5/1998 | Shachi et al. | |
| 5,854,349 A | 12/1998 | Abe et al. | |
| 5,863,986 A | 1/1999 | Herrmann-Schonherr et al. | |
| 5,916,989 A | 6/1999 | Brookhart, III et al. | |
| 6,090,888 A | 7/2000 | Khanarian et al. | |
| 6,225,407 B1 | 5/2001 | Jacobs et al. | |
| 6,255,396 B1 | 7/2001 | Ding et al. | |
| 6,590,033 B2 | 7/2003 | Ding et al. | |
| 6,596,810 B1 | 7/2003 | Hatke et al. | |
| 6,696,524 B2 | 2/2004 | Hausmann | |
| 6,767,966 B2 | 7/2004 | Berger et al. | |
| 6,844,059 B2 | 1/2005 | Bernd et al. | |
| 7,795,366 B2 * | 9/2010 | Yang et al. | 526/348 |
| 2003/0125464 A1 | 7/2003 | Yabui | |
| 2004/0236024 A1 | 11/2004 | Rivett et al. | |
| 2005/0014898 A1 | 1/2005 | Kanai | |
| 2005/0113621 A1 * | 5/2005 | Hope et al. | 585/521 |
| 2006/0173123 A1 * | 8/2006 | Yang et al. | 524/543 |
| 2006/0247332 A1 | 11/2006 | Coffey et al. | |
| 2007/0066739 A1 | 3/2007 | Odle et al. | |
| 2007/0149661 A1 | 6/2007 | Charati et al. | |

FOREIGN PATENT DOCUMENTS

DE 202887 10/1983

(Continued)

OTHER PUBLICATIONS

Co-Pending commonly owned U.S. Appl. No. 11/820,559, and related prosecution documents.

(Continued)

*Primary Examiner* — Vasu Jagannathan
*Assistant Examiner* — Irina Krylova
(74) *Attorney, Agent, or Firm* — Robert A. Migliorini

(57) ABSTRACT

This invention relates to a polymer composition comprising a blend comprising:
(a) greater than 30 wt (based upon the weight of the composition) of a cyclic olefin polymer having a $T_g$ greater than 60° C. and having a $T_m$ heat of fusion ($\Delta H_f$) of 40 J/g or less selected from the group consisting of:
 i) copolymers comprising at least one acyclic olefin and at least 15 mole % of one or more cyclic olefins; ii) partially or completely hydrogenated copolymers comprising at least one acyclic olefin and at least 15 mole % of one or more cyclic olefins; iii) metathesis copolymers comprising two or more cyclic olefins; iv) partially or completely hydrogenated metathesis copolymers comprising two or more cyclic olefins; v) metathesis homopolymers comprising cyclic olefins; vi) partially or completely hydrogenated metathesis homopolymers comprising cyclic olefins; and vii) mixtures thereof;
(b) from 1 to 50 wt % (based upon the weight of the composition) of an acyclic olefin polymer modifier having a glass transition temperature of less than 0° C.;
(c) from 0.1 to 50 wt % (based upon the weight of the composition) of a non-functionalized plasticizer having a kinematic viscosity at 100° C. of 3 to 3000 cSt, a viscosity index of 120 or more, a pour point of 0° C. or less and a flash point of 200° C. or more.

6 Claims, 3 Drawing Sheets

FOREIGN PATENT DOCUMENTS

| | | |
|---|---|---|
| EP | 617077 | 9/1994 |
| JP | 61181435 | 8/1986 |
| JP | 62064855 | 3/1987 |
| JP | 02180953 | 7/1990 |
| JP | 03227356 | 10/1991 |
| JP | 08127696 | 5/1996 |
| JP | 10158434 | 6/1998 |
| JP | 2000017087 | 7/1998 |
| JP | 200017087 | 1/2000 |
| JP | 2002128973 | 10/2000 |
| JP | 2001031716 | 2/2001 |
| JP | 2002128973 | 5/2002 |
| JP | 2002128974 | 5/2002 |
| JP | 2002128997 | 5/2002 |
| JP | 2004231921 | 8/2004 |
| JP | 2005010813 | 1/2005 |
| WO | WO 98/44043 | 10/1998 |

OTHER PUBLICATIONS

F. Stricker et al., Rubber-toughened cycloolefin copolymers, *Die Angewandte Makromolekulare Chemie*, vol. 256, No. 4503, pp. 101-104, 1998.

G. Khanarian, Rubber Toughened and Optically Transparent Blends of Cyclic Olefin Copolymers, *Polymer Engineering and Science*, vol. 40, No. 12, pp. 2590-2601, Dec. 2000.

Ohm, R.F.; Vial, T.M., "A New Synthetic Rubber Norsorex Polynorbornene," J. Elastomers & Plastics 1978, 10, 150-162.

* cited by examiner

POLYMER COMPOSITIONS COMPRISING CYCLIC OLEFIN POLYMERS, POLYOLEFIN MODIFIERS AND NON-FUNCTIONALIZED PLASTICIZERS

CROSS-REFERENCE TO RELATED APPLICATIONS

This application is a continuation in part of U.S. Ser. No. 11/820,739, filed Jun. 20, 2007 which claims the benefit of and priority to U.S. Ser. No. 60/835,524, filed Aug. 4, 2006 and U.S. Ser. No. 60/836,007, filed Aug. 7, 2006. This application is also a continuation in part of PCT/US2007/014381, filed Jun. 20, 2007.

FIELD

The present invention relates to polymer compositions comprising cyclic olefin polymers, polyolefin modifiers (also referred to as acyclic olefin polymer modifiers) and non-functionalized plasticizers.

BACKGROUND

Cyclic olefin polymers (particularly cyclic olefin copolymers) have high glass transition temperatures ($T_g$s) and high stiffness, however, they suffer from very poor impact properties and are too brittle for many applications. Numerous attempts have been made to improve their impact properties by blending with modifiers of many types, and their stiffness by blending with reinforcements. None of these previous attempts has been very successful, and for the most part, cyclic olefin polymers and copolymers have been relegated to applications taking advantage of only their optical clarity, moisture resistance, and good birefringence properties.

Polyolefins, and in particular those of the polyethylene and polypropylene groups, are low-cost, lower-density thermoplastics which melt readily and are resistant to chemicals. These materials therefore have many uses in areas such as general household items and electrical and electronic parts. However, polyolefins usually have poor mechanical properties and relatively low heat distortion temperatures (HDT). For example, a typical polypropylene homopolymer has a flexural modulus of 1.9 GPa, a heat distortion temperature at 0.46 MPa of 126° C., and a notched Izod impact resistance of 48 J/m. These plastics are therefore unsuitable for use in areas which require high heat resistance, high mechanical strength, and/or high impact resistance.

To improve their impact resistance, polypropylene homopolymers are often blended with ethylene-propylene rubber (EPR) or ethylene-propylene-diene (EPDM) rubber. EPR and EPDM rubbers are used for impact modification, because they remain ductile until their glass transition temperatures at −45° C. and effectively toughen polypropylene even at −29° C., a common testing temperature. EPR, EPDM, and polypropylene have similar polarities, so small rubber domains can be well dispersed in the polypropylene. Impact resistance can also be improved by copolymerizing the propylene with a few percent of ethylene to make impact copolymers. However, these improved impact properties come with decreased modulus and lowered heat distortion temperatures. Thus, a typical polypropylene impact copolymer containing EPR has flexural modulus of 1.0 GPa, a heat distortion temperature at 0.46 MPa of 92° C., a room temperature notched Izod impact strength so high that no test samples break (approx. 500 J/m or more), and generally has only ductile failures in the instrumented impact test at −29° C. (approx. 43 J of energy adsorbed).

To achieve more balanced properties, polypropylenes can be blended with both ethylene-propylene or ethylene-propylene-diene elastomers and inorganic fillers such as talc, mica, or glass fibers. Talc and mica reinforcements are generally preferred to glass fibers, because the compounded polymers have better surface and flow properties. An example of these materials is ExxonMobil's AS65 KW-1ATM, which has a flexural modulus of 2.4 GPa, a heat distortion temperature at 0.46 MPa of 124° C. and a notched Izod Impact of 400 J/m. These polymer blends have a good balance of properties and are used in automotive interior applications. However, these blends can not be used for some automotive structural applications, where useful materials need heat distortion temperatures at 0.46 MPa of at least 140° C. and at 1.80 MPa of at least 120° C., together with a modulus of at least 2.5 GPa and a room temperature notched Izod impact of at least 100 J/m.

In an attempt to achieve balanced properties that exceed those of blended polypropylenes, blends of cyclic olefin copolymers with polyolefins have also been proposed. Copolymers of ethylene with norbornene and with 2,3-dihydrodicyclopentadiene are disclosed in U.S. Pat. Nos. 2,799,668 (Jul. 16, 1957) and 2,883,372 (Apr. 21, 1959). However, these polymers use $TiCl_4$ as the catalyst and are polymerized by ring opening metathesis—the cyclic olefin rings are opened during copolymerizations with ethylene, leaving a residual double bond in the backbone of the polymer. Because the rings open, the chains are less rigid than addition polymerization cyclic olefin copolymers. The residual unsaturation in their backbones also make these polymers oxidatively unstable at high temperatures. Consequently, although these copolymers have desirable rigidity and transparency, they are poor in heat resistance.

U.S. Pat. No. 3,494,897 discloses a high pressure, peroxide initiated, radical copolymerization to make ethylene/cyclic olefin copolymers but these polymerizations can only incorporate small amounts of the cyclic olefins. As a result, the polymers do not have high glass transition temperatures. Several blends of ethylene/norbornene copolymers with polyolefins were described by researchers at VEB Leuna-Werke in the early 1980s (DE 2731445 C3, DD 150751, DD 203061, DD 203059, DD 203062, DD 205916, DD 206783, DD 209840, DD 214851, DD 214849, and DD 214850). However, these blends were made before the discovery of either the Ziegler-Natta vanadium/aluminum or metallocene addition polymerization catalysts. The ethylene/norbornene copolymers used in these blends were made with catalysts that open cyclic rings during polymerization and lead to residual unsaturation in the polymer backbones. The Vicat softening temperatures exemplified in these patents range from 114 to 133° C. indicating that these polymers do not have the heat stability required for automotive structural applications. In this respect, it is to be appreciated that Vicat softening temperatures are generally 10° C. higher than the glass transition temperature of a glassy polymer, whereas the glass transition temperature of a glassy polymer is generally 10° C. higher than its heat distortion temperature at 0.46 MPa. Thus Vicat softening temperatures from 114 to 133° C. are roughly equivalent to heat distortion temperatures of 94 to 113° C. using the 0.46 MPa load.

U.S. Pat. No. 4,614,778 discloses a random copolymer of ethylene with a 1,4,5,8-dimethano-1,2,3,4,4a,5,8,8a-octahydronaphthalene and optionally an alpha-olefin having at least three carbon atoms or a cycloolefin, such as norbornene. The mole ratio of polymerized units from the 1,4,5,8-dimethano- 1,2,3,4,4a,5,8,8a-octahydronaphthalene to polymerized units from ethylene is from 3:97 to 95:5 and the 1,4,5,8-dimethano-1,2,3,4,4a,5,8,8a-octahydronaphthalene is incorporated in the ethylene polymer chain using a Ziegler-Natta vanadium/aluminum catalyst. The cyclic olefin rings do not open during copolymerization, and the resultant copolymers contain no residual unsaturation in their backbone. Thus, these copolymers have high heat distortion temperatures and glass transition temperatures as high as 171° C. However, the copolymers are quite brittle, when pressed into films, and all are copolymers of ethylene and cyclic olefin comonomers containing at least four fused rings. The disadvantage of these larger comonomers is that extra Diels-Alder addition reactions are required to build them up from ethylene and cyclopentadiene, making them more expensive to synthesize than norbornene or dicyclopentadiene. No blends are exemplified in this patent.

U.S. Pat. No. 5,087,677 describes the copolymerization of ethylene and cyclic olefins, particularly norbornene, using zirconium and hafnium metallocene catalysts. Like the vanadium/aluminum polymerized copolymers described in U.S. Pat. No. 4,614,778, the metallocene polymerized copolymers do not have residual unsaturation in their backbones and the cyclic olefins do not ring open. Consequently, these metallocene ethylene/cyclic olefin copolymers have high heat stabilities and glass transition temperatures, with values as high as 163° C. for the glass transition temperature being exemplified. There is brief mention, but no exemplification, of alloying the copolymers with other polymers, such as polyethylene, polypropylene, (ethylene/propylene) copolymers, polybutylene, poly-(4-methyl-1-pentene), polyisoprene, polyisobutylene, and natural rubber. U.S. Pat. No. 4,918,133 discloses a cycloolefin type random copolymer composition, which is alleged to exhibit excellent heat resistance, chemical resistance, rigidity, and impact resistance, and which comprises (A) a random copolymer containing an ethylene component and a cycloolefin component and having an intrinsic viscosity [η] of 0.05-10 dl/g as measured at 135° C. in decalin and a softening temperature (TMA) of not lower than 70° C., and (B) one or more non-rigid copolymers selected from the group consisting of: (i) a random copolymer containing an ethylene component, at least one other α-olefin component and a cycloolefin component and having an intrinsic viscosity [η] of 0.01-10 dl/g as measured at 135° C. in decalin and a softening temperature (TMA) of below 70° C., (ii) a non-crystalline to low crystalline α-olefin type elastomeric copolymer formed from at least two α-olefins, (iii) an α-olefin-diene type elastomeric copolymer formed from at least two α-olefins and at least one non-conjugated diene, and (iv) an aromatic vinyl type hydrocarbon-conjugated diene copolymer or a hydrogenated product thereof, and optionally (c) an inorganic filler or organic filler. The cycloolefin component of the copolymer (A) can be a large number of 1 to 4-ring bridged cyclic olefins and, although these include norbornene, the only material exemplified is 1,4,5,8-dimethano-1,2,3,4,4a,5,8,8a-octahydronaphthalene (DMON) and a methyl-substituted version thereof.

U.S. Pat. No. 6,255,396 discloses a polymer blend useful for fabrication into transparent articles for medical applications and comprising 1-99% by weight of a first component obtained by copolymerizing a norbornene monomer and an ethylene monomer, and 99% to 1% by weight of a second component comprising an ethylene copolymer with an α-olefin having 6 carbon atoms. The first component has a glass transition temperature of from 50° C. to 180° C., but the second blend component has a softening points above 30° C. due to either its melting point (softening temperatures are slightly below the melting point) or its glass transition temperatures (softening point is typically 10° C. above $T_g$). No measurements of flexural modulus or impact strength are reported in the patent and no inorganic fillers are exemplified.

U.S. Pat. No. 6,590,033 discloses a polymer blend similar to that described in U.S. Pat. No. 6,255,396 but with the second component comprising a homopolymer or copolymer of a diene having from 4 to 12 carbons. Such diene polymers typically have softening points above 30° C. or solubility parameters that are too different from those of the cyclic olefin copolymers to be compatible. For example, the Bicerano solubility parameter for poly(1,4-butadiene) is 17.7 $J^{0.5}/cm^{1.5}$ compared with 16.88 $J^{0.5}/cm^{1.5}$ for the cyclic olefin copolymers. (Values are from Table 5.2 in *Prediction of Polymer Properties, $3^{rd}$ edition* by Jozef Bicerano published by Marcel Dekker in 2002.) In addition, poly(1,4-butadiene) is too polar to be effective at toughening cyclic olefin copolymers.

U.S. Pat. No. 6,844,059 discloses long-fiber-reinforced polyolefin structure of length ≧3 mm, which comprises a) from 0.1 to 90% by weight of at least one polyolefin other than b), b) from 0.1 to 50% by weight of at least one amorphous cycloolefin polymer, such as an ethylene/norbornenes copolymer, c) from 5.0 to 75% by weight of at least one reinforcing fiber, and d) up to 10.0% by weight of other additives. The polyolefin a) may be obtained by addition polymerization of ethylene or of an α-olefin, such as propylene, using a suitable catalyst and generally is a semi-crystalline homopolymer of an α-olefin and/or ethylene, or a copolymer of these with one another.

In *Die Angewandte Makromolekulare Chemie* 256 (1998), pp. 101-104, Stricker and Mulhaupt describe blends of an ethylene/norbornene copolymer containing only 40 wt. % norbornene The thermal stability of this copolymer is not reported, however the glass transition temperature can be estimated at less than 60° C. The rubber used to toughen the cyclic olefin copolymer is an polystyrene-b-poly(ethylene-co-butylene)-b-polystyrene (SEBS) copolymer. Polystyrene blocks in this copolymer have glass transition temperatures in the range 83-100° C., giving this modifier a softening temperature of more than 80° C.

In an article entitled "Rubber Toughened and Optically Transparent Blends of Cyclic Olefin Copolymers" in *Polymer Engineering and Science*, Vol. 40(12), p. 2590-2601, December, 2000, Khanarian describes unfilled blends of the ethylene/norbornene copolymer Topas™ 6013 with thermoplastic elastomers such as styrene-butadiene-styrene (SBS), styrene-ethylene-butadiene-styrene (SEBS), and styrene-ethylene-propylene-styrene (SEPS). The Topas™ 6013 has a glass transition temperature of 140° C. and it is reported that blending with less than 5 wt % of the elastomer allows the impact strength to be increased to greater than 50 J/m (Notched Izod) while keeping the optical haze below 5%. Using high loadings of the styrenic block copolymers, Khanarian achieves a notched Izod impact strengths as high as 520 J/m with 30 wt. % polystyrene-b-polybutadiene-b-polystyrene. This modifier has a softening point above 30° C. due to the glass transition temperature of the polystyrene blocks. Khanarian also exemplifies some blends with ethylene-propylene-diene terpolymers, but the impact strength reported is only 188 J/m with a 20 wt. % loading. Measured heat distortion temperatures are not presented in this paper but, given the low glass transition temperature of the Topas™ 6013, are probably less than 125° C. at 0.46 MPa.

Other references of interest include U.S. Pat. No. 4,874,808; U.S. Pat. No. 4,992,511; U.S. Pat. No. 5,428,098; U.S. Pat. No. 5,359,001; U.S. Pat. No. 5,574,100; U.S. Pat. No.

5,753,755; U.S. Pat. No. 5,854,349; U.S. Pat. No. 5,863,986; U.S. Pat. No. 6,090,888; U.S. Pat. No. 6,225,407; US 2003/0125464 A1; U.S. Pat. No. 6,596,810 B1; U.S. Pat. No. 6,696,524 B2; U.S. Pat. No. 6,767,966 B2; US 2004/0236024 A1; and US 2005/0014898 A1.

Certain polyalphaolefins have been used as non-functionalized plasticizers for simple polyolefins, to provide, inter alia, advantages such as lowered $T_g$, improved impact resistance, and the like. WO 2004/014988, WO 2004/014997, US 2004/0054040, US 2005/0148720, US 2004/0260001, and US 2004/0186214 disclose blends of various polyolefins with non-functionalized plasticizers for multiple uses. U.S. Ser. No. 11/118,925 and U.S. Ser. No. 11/119,193 disclose blends of polypropylene and non-functionalized plasticizers for multiple uses. WO 2006/083540 discloses blends of polyethylene and non-functionalized plasticizers.

Plasticizers have been used to modify various properties of neat cyclic olefin polymer resins. JP2000017087 A discloses the modification of cyclic olefin polymer resins with the functional plasticizers dioctyl adipate and dioctyl phthalate with improved haziness, wetness, and flexibility. DD 202887 discloses the modification of cyclic olefin polymer resins with low amounts (up to 8 wt %) of naphthenic and paraffinic oils to give transparent materials with reduced brittleness and processing properties. The cyclic olefin polymer resins of DD 202887 are similar to the other VEB Leuna-Werke resins prepared in the early 1980s, described in paragraph [0007] above.

Plasticizers are also present in a variety of blends containing elastomeric (non-high glass transition temperature and/or highly crosslinked) cyclic olefin polymers, such as Norsorex™ polynorbornene rubber and polyoctenamer (Vestenamer™) rubber, as for example in U.S. Pat. No. 4,504,604; U.S. Pat. No. 5,250,628; EP 0 617 077 B1; JP 2002128997; and JP 61181435A. These blends typically contain additional components such as stabilizing resins, other elastomers, and/or inorganic fillers. The rubbery cyclic olefin polymer does not function to provide thermoplastic structural rigidity to the blend, as is the case for the high glass transition, high stiffness thermoplastic cyclic olefin polymers in the blends discussed in previous paragraphs.

U.S. Ser. No. 11/820,739, filed Jun. 20, 2007 (and its equivalent PCT/US2007/014381), disclose that combining high glass transition temperature cyclic olefin copolymers with compatible, low glass transition temperature polyolefin elastomers can produce polymer compositions having a desirable combination of high stiffness, impact toughness, and thermal stability making the blends suitable for use in automotive structural applications.

According to the present invention, it has been found that combining high glass transition temperature cyclic olefin polymers and copolymers with compatible, low glass transition temperature polyolefin elastomers and non-functionalized plasticizers can produce polymer compositions having even more desirable properties, such as superior low-temperature impact toughness and modified glass transition temperatures that provide manufacturing advantages. The superior low-temperature impact toughness of these compositions is an unexpected feature, as compared to the properties of compositionally analogous two-component blends that comprise only high glass transition temperature cyclic olefin copolymers and non-functionalized plasticizers. The present invention also can produce polymer compositions having a desirable combination of high stiffness, impact toughness, and thermal stability making the blends suitable for use at high temperature in automotive structural applications.

SUMMARY

This invention relates to blends comprising:
(a) greater than 30 wt % (based upon the weight of the composition) of a cyclic olefin polymer having a $T_g$ greater than 60° C. and a $T_m$ heat of fusion of 40 J/g or less selected from the group consisting of:
  i) copolymers comprising at least one acyclic olefin and at least 15 mole % of one or more cyclic olefins; ii) partially or completely hydrogenated copolymers comprising at least one acyclic olefin and at least 15 mole % of one or more cyclic olefins; iii) metathesis copolymers comprising two or more cyclic olefins; iv) partially or completely hydrogenated metathesis copolymers comprising two or more cyclic olefins; v) metathesis homopolymers comprising cyclic olefins; vi) partially or completely hydrogenated metathesis homopolymers comprising cyclic olefins; and vii) mixtures thereof;
(b) 1 to 50 wt % (based upon the weight of the composition) of an acyclic olefin polymer modifier having a glass transition temperature of less than 0° C.;
(c) from 0.1 to 50 wt (based upon the weight of the composition) of a non-functionalized plasticizer having a kinematic viscosity at 100° C. of 3 to 3000 cSt, a viscosity index of 120 or more, a pour point of 0° C. or less and a flash point of 200° C. or more.

In another embodiment, the invention resides in a polymer composition comprising:
(a) greater than 50 wt % (based upon the weight of the composition) of a cyclic olefin copolymer, said cyclic olefin copolymer comprising at least one acyclic olefin and at least 20 wt % of one or more cyclic olefins (based upon the weight of the cyclic olefin copolymer), wherein at least a portion of said cyclic olefin copolymer has a glass transition temperature of greater than 150° C.;
(b) less than 50 wt (based upon the weight of the composition) of an acyclic olefin polymer modifier, at least a portion of the modifier having a glass transition temperature of less than −30° C.; and no portion of the modifier having a softening point greater than +30° C., the Bicerano solubility parameter of the modifier being no more than 0.6 $J^{0.5}/cm^{1.5}$ less than the Bicerano solubility parameter of the cyclic olefin copolymer;
(c) a non-functionalized plasticizer, having a kinematic viscosity at 100° C. of 10 cSt or more, a viscosity index of 120 or more, and a pour point of 0° C. or less;
wherein the notched Izod impact resistance of the composition measured at 23° C. is greater than 500 J/m and the heat distortion temperature of the composition measured using a 0.46 MPa load is greater than 135° C.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
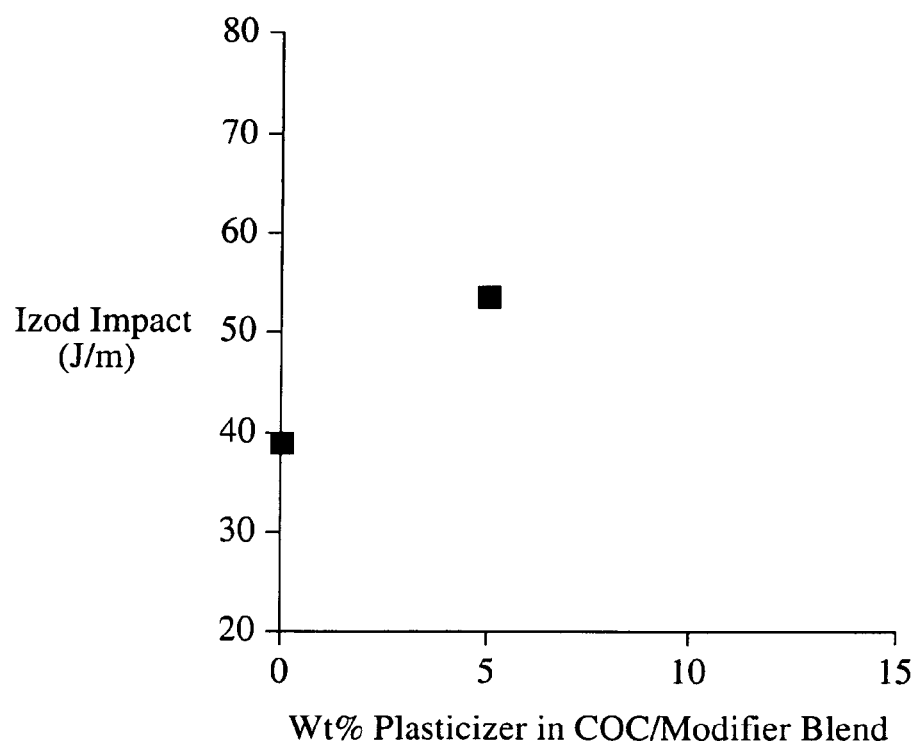
FIG. 1 is a graph showing the beneficial effect of non-functionalized plasticizer on the −18° C. Izod impact strength of a cyclic olefin copolymer/polymer modifier blend (Example 1).

When a polymer or oligomer is referred to as comprising an olefin, the olefin present in the polymer or oligomer is the polymerized or oligomerized form of the olefin, respectively. The term polymer is meant to encompass homopolymers and copolymers. The term copolymer includes any polymer having two or more different monomers in the same chain, including terpolymers and tetrapolymers, and encompasses random copolymers, statistical copolymers, alternating copolymers, interpolymers, (true) block copolymers, and copolymers possessing more than one of these microstructures in a single chain, such as block copolymers in which one block segment is an alternating copolymer of two monomers and another block segment is a homopolymer segment. Thus the term cyclic olefin polymers includes cyclic olefin copolymers and cyclic olefin homopolymers. All numerical values within the detailed description and the claims herein are understood as modified by "about."

For the purposes of this invention a "liquid" is defined to be a fluid that has no distinct melting point above 0° C. and has a kinematic viscosity at 100° C. of 3000 cSt or less and/or a KV40 of 35,000 cSt or less. Preferably the liquid has no distinct melting point above −20° C. and a $KV_{100}$ of 1000 cSt or less and/or a $KV_{40}$ of 10,000 cSt or less.

HDT is heat distortion temperature. $KV_{100}$ is kinematic viscosity at 100° C. $KV_{40}$ is kinematic viscosity at 40° C. VI is viscosity index. NFP is non-functionalized plasticizer. PAO is polyalphaolefin.

Unless noted otherwise, percents express a weight percent (wt %), based on the total amount of the material or component at issue; Weight average molecular weight ($M_w$), number average molecular weight ($M_n$), and z average molecular weight ($M_z$) are each determined utilizing gel permeation chromatography (GPC) and have units of g/mol. Molecular weight distribution (MWD) is defined as $M_w/M_n$. For purposes of this invention an oligomer is defined to have an $M_n$ of less than 21,000 g/mol. Preferred oligomers have an $M_n$ of less than 20,000 g/mol, preferably less than 19,000 g/mol, preferably less than 18,000 g/mol, preferably less than 16,000 g/mol, preferably less than 15,000 g/mol, preferably less than 13,000 g/mol, preferably less than 10,000 g/mol, preferably less than 5000 g/mol, preferably less than 3000 g/mol. $H_f$ is heat of fusion upon melting ($T_m$), also referred to as Hf, $\Delta H_f$, and $T_m$ heat of fusion.

The present invention provides a polymer composition comprising:
(a) greater than 30 wt %, preferably from 32 to 99 wt %, more preferably from 35 to 95 wt % (based upon the weight of the composition) of a cyclic olefin polymer having a $T_g$ greater than 60° C. and a $T_m$ heat of fusion of 40 J/g or less selected from the group consisting of:
i) copolymers comprising at least one acyclic olefin and at least 15 mole % (preferably at least 17.5 mole %, more preferably at least 18 mole %) of one or more cyclic olefins; ii) partially or completely hydrogenated copolymers comprising at least one acyclic olefin and at least 15 mole % (preferably at least 17.5 mole %, more preferably at least 18 mole %) of one or more cyclic olefins; iii) metathesis copolymers comprising two or more cyclic olefins; iv) partially or completely hydrogenated metathesis copolymers comprising two or more cyclic olefins; v) metathesis homopolymers comprising cyclic olefins; vi) partially or completely hydrogenated metathesis homopolymers comprising cyclic olefins; and vii) mixtures thereof;
(b) from 1 to 50 wt %, preferably from 1 to 45 wt %, more preferably from 2 to 40 wt % (based upon the weight of the composition) of an acyclic olefin polymer modifier having a glass transition temperature of less than 0° C.;
(c) from 0.1 to 50 wt %, preferably from 0.25 to 45 wt %, more preferably from 0.5 to 40 wt % (based upon the weight of the composition) of a non-functionalized plasticizer having a $KV_{100}$ of 3 to 3000 cSt (preferably 5 cSt or more, more preferably 10 cSt or more, preferably from 3 to 1000 cSt, preferably from 5 to 500 cSt, preferably from 4 to 200 cSt, more preferably from 10 to 100 cSt), a VI of 120 or more (preferably 150 or more, preferably 200 or more), a pour point of 0° C. or less (preferably −10° C. or less, more preferably −20° C. or less, more preferably −25° C. or less) and a flash point of 200° C. or more (preferably 220° C. or more, preferably 230° C. or more).

In a preferred embodiment the polymers of i) to vi) are highly amorphous.

This invention also provides a polymer composition comprising:
(a) greater than 50 wt (based upon the weight of the composition) of a cyclic olefin copolymer, said cyclic olefin copolymer comprising at least one acyclic olefin and at least 20 wt % of one or more cyclic olefins (based upon the weight of the cyclic olefin copolymer), wherein at least a portion of said cyclic olefin copolymer has a glass transition temperature of greater than 150° C.;
(b) less than 50 wt (based upon the weight of the composition) of an acyclic olefin polymer modifier, at least a portion of the modifier having a glass transition temperature of less than −30° C.; and no portion of the modifier having a softening point greater than +30° C., the Bicerano solubility parameter of the modifier being no more than 0.6 $J^{0.5}/cm^{1.5}$ less than the Bicerano solubility parameter of the cyclic olefin copolymer;
(c) an NFP having a $KV_{100}$ of 10 cSt or more, a viscosity index of 120 or more, and a pour point of 0° C. or less (preferably the NFP has a $KV_{100}$ of 10 to 3000 cSt, a VI of 120 or more, a pour point of −20° C. or less and a flash point of 200° C. or more);
wherein the notched Izod impact resistance of the composition measured at 23° C. is greater than 500 J/m and the heat distortion temperature of the composition measured using a 0.46 MPa load is greater than 135° C. Because this blend has a notched Izod greater than 500 J/m and a heat distortion temperature measured using a 0.46 MPa load of greater than 135° C. it is highly suitable for use in automotive structural applications.

In some embodiments, the cyclic olefin copolymer comprises at least 30 weight %, such as at least 40 weight %, of one or more cyclic olefins. In another embodiment, at least a portion of said cyclic olefin copolymer has a glass transition temperature of greater than 160° C., even greater than 170° C. In one embodiment all of said cyclic olefin copolymer has a glass transition temperature of greater than 150° C.

In another embodiment, at least a portion of the polymer modifier has a glass transition temperature of less than −40° C., such as less than −50° C. In one embodiment, all of said polymer modifier has a glass transition temperature of less than −30° C. In another embodiment, no portion of the modifier has a softening point greater than +10° C.

In some embodiments, the Bicerano solubility parameter of the modifier is between 0.1 and 0.5 $J^{0.5}/cm^{1.5}$, such as between 0.2 and 0.4 $J^{0.5}/cm^{1.5}$, less than the Bicerano solubility parameter of the cyclic olefin copolymer.

In some embodiments, the polymer composition has a notched Izod impact resistance measured at 23° C. of greater than 550 J/m, for example greater than 600 J/m, even greater than 700 J/m; a notched Izod impact resistance measured at −18° C. greater than 50 J/m. such as greater than 150 J/m, for example greater than 300 J/m, even greater than 500 J/m; an instrumented impact energy measured at 23° C. of greater than 25 J, such as greater than 30 J; an instrumented impact energy measured at −29° C. of greater than 25 J, such as greater than 30 J; a heat distortion temperature measured using a 0.46 MPa load of greater than 150° C., such as greater than 165° C.; a heat distortion temperature measured using a 1.80 MPa load of greater than 115° C., such as greater than 130° C., for example greater than 145° C.; and a flexural modulus (1% secant method) of greater than 1200 MPa, such as greater than 2000 MPa, for example greater than 2500 MPa.

In another embodiment the blends of this invention have a room temperature flexural modulus (1% secant, as determined below in the examples section) of at least 1035 MPa and a −18° C. Izod Impact (forward notch, as determined below in the examples section) of at least 40 J/m. Preferably the blends of this invention have a room temperature flexural modulus of at least 1448 MPa, preferably at least 1655 MPa. Preferably the blends of this invention have a −18° C. Izod Impact (forward notch) of at least 45 J/m, preferably at least 50 J/m.

In another embodiment, the compositions of this invention comprise less than 5 wt % (preferably less than 3 wt %, preferably 0 wt %) of a homopolymer of ethylene or copolymer of at least 50 mole % ethylene and one or more C3 to C20 linear or branched alpha-olefins. In another embodiment, the compositions of this invention comprise less than 5 wt % (preferably less than 3 wt %, preferably 0 wt %) of a homopolymer of propylene or copolymer of at least 50 mole % propylene and one or more of ethylene and/or C3 to C20 linear or branched alpha-olefins. In another embodiment, the compositions of this invention comprise less than 5 wt % (preferably less than 3 wt %, preferably 0 wt %) of a crosslinked polyethylene. In another embodiment, the compositions of this invention comprise less than 5 wt % (preferably less than 3 wt %, preferably 0 wt %) of a styrenic block copolymer. Styrenic block copolymer (SBC) means a block copolymer of styrene and alpha-methyl-styrene and an olefin such as an alpha-olefin (ethylene, propylene, butene) or an alkadiene (isobutylene, isoprene, butadiene) and hydrogenated or chemically modified versions of the block copolymer. The block copolymers may be in diblock, triblock, linear (including tapered) or radial (including tapered) block form.

In a preferred embodiment, the blend is not crosslinked. In another embodiment, the cyclic olefin polymer is not crosslinked. Crosslinked is defined to be a polymer that has been treated with a cure/crosslinking agent (such as heat, pressure, UV radiation, a chemical (peroxide, etc.)) to cause bonds to form between the polymer chains. In some embodiments, crosslinking can be evidenced by an increase in molecular weight ($M_w$ and/or $M_n$ measured as described below) and/or an increase in hardness (Shore A) and/or stiffness (1% Secant flexural modulus). Typically the increase is at least 10%, preferably at least 30%, preferably at least 50%, preferably at least 70%, compared to the polymer prior to crosslinking.

Cyclic Olefin Polymer/Cyclic Olefin Copolymer

In a preferred embodiment, the cyclic olefin homopolymer or copolymer (also referred to as the first copolymer, first polymer or first homopolymer) useful herein is a cyclic olefin homopolymer or copolymer having a $T_g$ greater than 60° C. (preferably greater than 65° C., preferably greater than 70° C.) and a $T_m$ heat of fusion of 40 J/g or less selected from the group consisting of:

i) highly amorphous copolymers comprising at least one acyclic olefin (preferably one or more alpha-olefins, preferably ethylene and or propylene) and at least 15 mole % (preferably at least 17.5 mole %, preferably at least 18 mole %) of one or more cyclic olefins (such as norbornene (bicyclo [2,2,1]hept-2-ene), norbornadiene, dicyclopentadiene, 2,3,3a,4,7,7a-hexahydro-4,7-methano-1H-indene, tricyclodecene (also referred to as dihydrodicyclopentadiene, 3a,4,5,6,7,7a-hexahydro-4,7-methano-1H-indene, or tricyclo [$5.2.1.0^{2,6}$]dec-3-ene), tetracyclododecene (also referred to as octahydrodimethanonaphthalene or 1,2,3,4,4a,5,8,8a-octahydro-1,4:5,8-dimethanonaphthalene), substituted derivatives thereof, and higher Diels-Alder derivates thereof); ii) partially or completely hydrogenated highly amorphous copolymers comprising at least one acyclic olefin (preferably one or more alpha-olefins, preferably ethylene and or propylene) and at least 15 mole % (preferably at least 17.5 mole %, preferably at least 18 mole %) of one or more cyclic olefins (such as norbornadiene, dicyclopentadiene, substituted derivatives thereof, and higher Diels-Alder derivates thereof); iii) highly amorphous metathesis copolymers comprising two or more cyclic olefins (such as norbornene, norbornadiene, dicyclopentadiene, 2,3,3a,4,7,7a-hexahydro-4,7-methano-1H-indene, tricyclodecene, tetracyclododecene, substituted derivatives thereof, and higher Diels-Alder derivates thereof); iv) partially or completely hydrogenated highly amorphous metathesis copolymers comprising two or more cyclic olefins (such as norbornene, norbornadiene, dicyclopentadiene, 2,3,3a,4,7,7a-hexahydro-4,7-methano-1H-indene, tricyclodecene, tetracyclododecene, substituted derivatives thereof, and higher Diels-Alder derivates thereof); v) highly amorphous metathesis homopolymers comprising cyclic olefins (such as norbornene, norbornadiene, dicyclopentadiene, 2,3,3a,4,7,7a-hexahydro-4,7-methano-1H-indene, tricyclodecene, tetracyclododecene, substituted derivatives thereof, and higher Diels-Alder derivates thereof); vi) partially or completely hydrogenated highly amorphous metathesis homopolymers comprising cyclic olefins (such as norbornene, norbornadiene, dicyclopentadiene, 2,3,3a,4,7,7a-hexahydro-4,7-methano-1H-indene, tricyclodecene, tetracyclododecene, substituted derivatives thereof, and higher Diels-Alder derivates thereof); and vii) mixtures thereof.

Highly amorphous cyclic olefin polymer materials are materials in which no crystallinity, or only very small levels of crystallinity, are present. Such polymers typically show excellent optical properties in neat form. As referred to herein, a highly amorphous cyclic olefin polymer (or copolymer) is defined to be a material having a $T_m$ heat of fusion of less than 40 J/g (DSC, second melt). A material that has no discernible melting temperature ($T_m$) in its second heat differential scanning calorimetry (DSC) spectrum is defined to have a $\Delta H_f$ of zero. Preferably the cyclic olefin polymer has an $\Delta H_f$ of less than 30 J/g, preferably less than 20 J/g, preferably less than 10 J/g, preferably less than 5 J/g, preferably less than 0.5 J/g, preferably the $\Delta H_f$ is 0 J/g.

In another embodiment, the cyclic olefin polymer has a light transmittance of at least 89 according to ASTM D1003, preferably at least 90.

Partially hydrogenated is defined to mean that at least 1% of the polymer's residual and/or main chain double bonds have been saturated, as compared to the polymer prior to hydrogenation. In preferred partially hydrogenated polymers, at least 30% of the polymer's double bonds have been saturated, as compared to the polymer prior to hydrogenation. (in preferred partially hydrogenated polymers preferably at least 50%, preferably at least 75%, preferably at least 90%, preferably at least 95%, of the polymer's double bonds have been saturated, as compared to the polymer prior to hydrogenation.) Complete hydrogenation means at least 99%, preferably 100% of the polymer's double bonds have been saturated, as compared to the polymer prior to hydrogenation.

The cyclic olefin polymer component of the present polymer composition is produced, in some embodiments, by copolymerizing at least one cyclic olefin with at least one acyclic olefin and, in some embodiments, possibly with one or more dienes. In this instance, the polymerizing olefin units of both the cyclic olefin comonomer(s) and the acyclic olefin comonomer(s) are enchained by the formation of single bonds between the comonomer units and the accompanying transformation of the polymerizing olefin unit into a single bond. The total amount of all the cyclic olefins in the first copolymer is preferably from 20 to 99 weight % of the copolymer in some embodiments, whereas in others the total amount of the cyclic olefins present is at least 15 mole %. The residual double bonds in cyclic olefin copolymers may not have reacted or may have been partially or completely hydrogenated, crosslinked, or functionalized. Cyclic olefin copolymers may have been grafted using free radical addition reactions or in-reactor copolymerizations. They may be block copolymers made using chain shuttling agents.

In other embodiments the copolymerization takes place via the metathesis polymerization mechanism of two or more cyclic olefins. In yet other embodiments a metathesis homopolymerization, rather than a copolymerization, takes place with a single cyclic olefin. In these instances, the cyclic structure containing the polymerizing olefin unit of the cyclic olefin(s) is broken between the olefinic carbon termini, with the concomitant formation of new cis or trans double bonds between cyclic olefin comonomer units. In some metathesis polymerizations, small amounts of acyclic olefins may be added as molecular weight regulators. These species do not function as comonomers since they are not enchained in an intact fashion but are cleaved into two separate portions across the olefin unit, with one portion of the acyclic monomer forming a chain end group and the other forming a non-enchained byproduct. The double bond units in the metathesis polymer main chain may also remain intact, or may be partially or completely hydrogenated, crosslinked, or functionalized.

Cyclic olefins are defined herein as olefins where at least one double bond is contained in one or more alicyclic rings. Cyclic olefins may also have acyclic double bonds in side chains; however, the double bond which participates in the polymerization is the double bond contained within the alicyclic ring structure. Suitable cyclic olefins for use in the cyclic olefin polymer or copolymer component include, but are not limited to, norbornene (bicyclo[2,2,1]hept-2-ene), tricyclodecene (also referred to as dihydrodicyclopentadiene, 3a,4,5,6,7,7a-hexahydro-4,7-methano-1H-indene, or tricyclo[5.2.1.0$^{2,6}$]dec-3-ene), dicyclopentadiene (as mixtures of, or as individual endo or exo isomers), 2,3,3a,4,7,7a-hexahydro-4,7-methano-1H-indene, tetracyclododecene (also referred to as octahydrodimethanonaphthalene or 1,2,3,4,4a,5,8,8a-octahydro-1,4:5,8-dimethanonaphthalene), hexacycloheptadecene, tricycloundecene, pentacyclohexadecene, ethylidene norbornene (ENB), vinyl norbornene (VNB), alkylnorbornenes, norbornadiene, cyclopentene, cyclopropene, cyclobutene, cyclohexene, cycloheptene, cyclopentadiene (CP), cyclohexadiene, cyclooctene, cyclooctadiene, cyclooctatriene, cyclooctatetraene, cyclododecene, indene, any Diels-Alder adduct of cyclopentadiene and an acyclic olefin, cyclic olefin, or diene; any Diels-Alder adduct of butadiene and an acyclic olefin, cyclic olefin, or diene; vinylcyclohexene (VCH) (enchained through its cyclic double bond); alkyl derivatives of cyclic olefins, such as those substituted with one or more methyl, ethyl, propyl, or butyl substituents; and aromatic derivatives of cyclic olefins. Cyclic olefin derivatives bearing functionalized substituents (groups containing at least one non-carbon or non-hydrogen atom, such as an oxygen, nitrogen, or silicon atoms), are also suitable when used in small amounts as co- or termonomers.

Suitable acyclic olefins for use in cyclic olefin copolymer component include, but are not limited to, alpha-olefins (1-alkenes), isobutene, 2-butene, and vinylaromatics. Examples of such acyclic olefins are ethylene, propylene, 1-butene, isobutene, 2-butene, 1-pentene, 1-hexene, 1-heptene, 1-octene, 1-nonene, 1-decene, styrene, p-methylstyrene, p-t-butylstyrene, p-phenylstyrene, 3-methyl-1-pentene, vinylcyclohexane, 4-methyl-1-pentene, alkyl derivatives of acyclic olefins, and aromatic derivatives of acyclic olefins.

Dienes are defined herein broadly as including any olefin containing at least two acyclic double bonds. They may also contain aromatic substituents. If one or more of the double bonds of diene is contained in an alicyclic ring and participates in polymerization using the cyclic double bond, the monomer is classified as a cyclic olefin in this invention. Suitable dienes for use in the cyclic olefin copolymer component are 1,4-hexadiene; 1,5-hexadiene; 1,5-heptadiene; 1,6-heptadiene; 1,6-octadiene; 1,7-octadiene; 7-methyl-1,6-octadiene; 1,9-decadiene; butadiene; 1,3-pentadiene; isoprene; 1,3-hexadiene; 1,4-pentadiene; 4-vinyl-1-cyclohexene (when enchained solely through its vinylic double bond); p-divinylbenzene; alkyl derivatives of dienes; and aromatic derivatives of dienes.

Suitable cyclic olefin polymers and copolymers for use as the first polymer or copolymer component of the present composition include, but are not limited to; ethylene-norbornene copolymers; ethylene-dicyclopentadiene copolymers; ethylene-norbornene-dicyclopentadiene terpolymers; ethylene-2,3,3a,4,7,7a-hexahydro-4,7-methano-1H-indene copolymers; ethylene-tricyclodecene copolymers; ethylene-norbornene-2,3,3a,4,7,7a-hexahydro-4,7-methano-1H-indene terpolymers; ethylene-dicyclopentadiene-2,3,3a,4,7,7a-hexahydro-4,7-methano-1H-indene terpolymers; ethylene-norbornene-tricyclodecene terpolymers; ethylene-norbornene-tetracyclododecene terpolymers; ethylene-norbornene-ethylidene norbornene terpolymers; ethylene-norbornene-vinylnorbornene terpolymers; ethylene-norbornene-1,7-octadiene terpolymers; ethylene-cyclopentene copolymers; ethylene-indene copolymers; ethylene-tetracyclododecene copolymers; ethylene-norbornene-vinylcyclohexene terpolymers; ethylene-norbornene-7-methyl-1,6-octadiene terpolymers; propylene-norbornene copolymers; ethylene-propylene-norbornene terpolymers; propylene-dicyclopentadiene copolymers; ethylene-propylene-dicyclopentadiene terpolymers; propylene-2,3,3a,4,7,7a-hexahydro-4,7-methano-1H-indene copolymers; ethylene-propylene-2,3,3a,4,7,7a-hexahydro-4,7-methano-1H-indene terpolymers; propylene-norbornene-2,3,3a,4,7,7a-hexahydro-4,7-methano-1H-indene terpolymers; propylene-tricyclodecene copolymers; ethylene-propylene-tricyclodecene terpolymers; propylene-tetracyclododecene copolymers; ethylene-propylene-tetracyclododecene terpolymers; ethylene-norbornene-tetracyclododecene terpolymers; ethylene-norbornene-styrene terpolymers; ethylene-norbornene-p-methylstyrene terpolymers; functionalized ethylene-dicyclopentadiene copolymers; functionalized ethylene-dicyclopentadiene-2,3, 3a,4,7,7a-hexahydro-4,7-methano-1H-indene terpolymers; functionalized propylene-dicyclopentadiene copolymers; functionalized ethylene-norbornene-dicyclopentadiene terpolymers; functionalized ethylene-propylene-dicyclopentadiene terpolymers; functionalized ethylene-norbornene-diene copolymers; maleic anhydride grafted cyclic olefin polymers and copolymers; silane grafted polymers and cyclic olefin copolymers; hydrogenated ethylene-dicyclopentadiene copolymers; hydrogenated ethylene-dicyclopentadiene-2,3,3a,4,7,7a-hexahydro-4,7-methano-1H-indene terpolymers; hydrogenated propylene-dicyclopentadiene copolymers; hydrogenated ethylene-propylene-dicyclopentadiene terpolymers; hydrogenated ethylene-norbornene-dicyclopentadiene terpolymers; epoxidized ethylene-dicyclopentadiene copolymers; epoxidized ethylene-propylene-dicyclopentadiene terpolymers; epoxidized ethylene-norbornene-dicyclopentadiene terpolymers; grafted cyclic olefin polymers and copolymers; short chain branched cyclic olefin polymers and copolymers; long chain branched cyclic olefin polymers and copolymers; crosslinked cyclic olefin polymers and copolymers; non-crosslinked cyclic olefin polymers and copolymers; linear cyclic olefin polymers and copolymers; norbornene-dicyclopentadiene metathesis copolymers; hydrogenated norbornene-dicyclopentadiene metathesis copolymers; metathesis copolymers of dicyclopentadiene with alkyl-substituted cyclic olefins and hydrogenated derivatives thereof; metathesis copolymers of norbornene with alkyl-substituted norbornenes or other alkyl-substituted cyclic olefins and hydrogenated derivatives thereof; metathesis copolymers of tricyclodecene with alkyl-substituted cyclic olefins and hydrogenated derivatives thereof; and metathesis copolymers of tetracyclododecene with alkyl-substituted cyclic olefins and hydrogenated derivatives thereof. Suitable cyclic olefin metathesis homopolymers include, but are not limited to, homopolymers of dicyclopentadiene, 2,3,3a,4,7,7a-hexahydro-4,7-methano-1H-indene, tricyclodecene, tetracyclododecene, substituted derivatives of these monomers, higher Diels-Alder derivatives of norbornene and/or these monomers; and partially or completely hydrogenated derivatives of these homopolymers.

Cyclic olefin polymers or copolymers containing norbornene, dicyclopentadiene, 2,3,3a,4,7,7a-hexahydro-4,7-methano-1H-indene, tricyclodecene, octahydrodimethanonaphthalene, tetracyclododecene, alkyl-substituted derivatives of these monomers, higher Diels-Alder derivatives of these monomers, or hydrogenated dicyclopentadiene are particularly preferred. Norbornene is made from the Diels-Alder addition of cyclopentadiene and ethylene. (Cyclopentadiene is made commercially by a reverse Diels-Alder reaction starting with dicyclopentadiene). Dicyclopentadiene is a byproduct of cracking heavy feedstocks to make ethylene and propylene. Other preferred cyclic olefins are Diels-Alder adducts of cyclopentadiene with other olefins, leading to alkyl- or aryl-norbornenes, or with butadiene leading to vinylnorbornene and ethylidene norbornene. The Diels-Alder adduct of butadiene with itself leads to vinylcyclohexene, which is another preferred monomer. A preferred acyclic olefin for cyclic olefin copolymers is ethylene since ethylene-cyclic olefin copolymers have slightly better impact properties than other copolymers. Propylene, and mixtures of ethylene and propylene, are also preferred as acyclic olefins. Terpolymers of ethylene with norbornene and dienes containing a double bond in alicyclic rings are also preferred, because they can easily be crosslinked, grafted, or functionalized.

In some embodiments, such as for high temperature uses, at least a portion of the cyclic olefin copolymer employed in the first copolymer component of the present composition has a glass transition temperatures greater than 150° C. These high glass transition temperature domains will start softening 10-30° C. below the glass transition temperature and lead to heat distortion temperatures using a 0.45 MPa load of 10-15° C. below their glass transition temperature and to heat distortion temperatures using a 1.80 MPa load of 30-35° C. below the glass transition temperature. It is preferred that the glass transition temperature of at least a portion of these cyclic olefin copolymers is greater than 160° C. and more preferably is greater than 170° C. If only a portion of the cyclic olefin copolymers has a glass transition temperature greater than 150° C., it is preferable that the remaining portion has a softening point below 30° C. Such a cyclic olefin copolymer might be a block or graft copolymer with an elastomer. If a portion of the cyclic olefin copolymer has a softening point above 30° C. and below the softening point associated with the glass transition temperature above 150° C., it will tend to lower the heat distortion temperature and high temperature modulus of the composition. Cyclic olefin copolymers where all the domains have glass transition temperatures greater than 100° C. are preferred.

For automotive applications, where the present composition is to be injection molded, it is also preferred for the cyclic olefin copolymers to have high melt flow rates when measured at the processing temperatures of the injection molding machine. Melt flow rates greater than 5 ml/10 min in the ISO 1133 test at 115° C. above the heat distortion temperature using the 1.80 MPa load are preferred.

Preferred cyclic olefin polymers useful herein may be selected from the group consisting of: copolymers comprising ethylene and norbornene, copolymers comprising ethylene and octahydrodimethanonaphthalene, copolymers comprising ethylene and a substituted derivative of octahydrodimethanonaphthalene, terpolymers comprising ethylene, octahydrodimethanonaphthalene, and a substituted derivative of octahydrodimethanonaphthalene, copolymers comprising ethylene and 2,3,3a,4,7,7a-hexahydro-4,7-methano-1H-indene, copolymers comprising ethylene, norbornene, and 2,3,3a,4,7,7a-hexahydro-4,7-methano-1H-indene; copolymers comprising ethylene and dicyclopentadiene or a hydrogenated derivative of such a copolymer; copolymers comprising ethylene, norbornene, and dicyclopentadiene or a hydrogenated derivative of such a copolymer; or hydrogenated metathesis homopolymers or copolymers of dicyclopentadiene or tetracyclododecene.

Useful ethylene-norbornene and ethylene-octahydrodimethanonaphthalene copolymers can be purchased from Topas Advanced Polymers (Topas™) and Mitsui Chemicals (Apel™) Ethylene/norbornene copolymers made with metallocene catalysts are available commercially from Topas™ Advanced Polymers GmbH, as Topas™ copolymers, for example as grades 5010L-01, 8007, 8007S-04, 8007F-04, 8007x10, TKX-0001, 5013, 5013S-04, 6013, 6013S-04, 6015, 6015S-04, 6017, and 6017S-04. Topas™ grades 6015 and 6017 are reported to have glass transition temperatures of 160 and 180° C., respectively. Their reported heat distortion temperatures at 0.46 MPa (150 and 170° C., respectively) and at 1.80 MPa (135 and 151° C., respectively) can provide polymer compositions meeting the preferred heat distortion temperature of at least 130° C. at 0.46 MPa. Ethylene-octahydrodimethanonaphthalene copolymers are available as, for example, Apel™ grades 8008T, 6509T, 6011T, 6013T, 5014DP, and 6015T.

Other useful cyclic-olefin copolymers can be made using vanadium, Ziegler-Natta, and metallocene catalysts. Examples of suitable catalysts are disclosed in U.S. Pat. Nos. 4,614,778 and 5,087,677.

Useful metathesis cyclic olefin polymers, such as hydrogenated tetracyclododecene- and dicyclopentadiene-based polymers, can be purchased from Nippon Zeon Corporation. Such materials include Zeonex™, for example grades 480, 480R, E48R, 330R, and RS820, and Zeonor™, for example grades 750R, 1020R, and 1060R. General methods of making such materials are disclosed in representative form in, for example, U.S. Pat. No. 5,106,920 A.

Acyclic Olefin Second Polymer

The second polymer component of the present composition (also referred to as the acyclic olefin polymer modifier or the polymer modifier) comprises one or more random, blocky, or block polymers. Many of the polymers are polymerized from at least one olefin and, possibly, at least one diene. In one embodiment (such as high temperature uses), the olefins in the second polymer component can be either acyclic or cyclic olefins, as long as the total amount of cyclic olefin in the copolymer is less than 20 weight %. In another embodiment, involving an elastomeric second polymer component, cyclic olefins are present at 1 to 40 mole % in a material having a cycloolefin component, an ethylene component, and an alpha-olefin component. The residual double bonds in the polyolefin modifiers may not have been reacted or may have been hydrogenated, functionalized, or crosslinked. The polyolefin modifiers may have been grafted using free radical addition reactions or in-reactor copolymerizations. They may be block copolymers made using chain shuttling agents.

Acyclic olefins suitable for use in the second polymer component include alpha-olefins (1-alkenes), isobutene, 2-butene, and vinylaromatics. Examples of such acyclic olefins are ethylene, propylene, 1-butene, isobutene, 2-butene, 1-pentene, 1-hexene, 1-heptene, 1-octene, 1-nonene, 1-decene, styrene, p-ethylstyrene, p-t-butylstyrene, p-phenylstryene, 3-methyl-1-pentene, vinylcyclohexane, 4-methyl-1-pentene, alkyl derivatives of acyclic olefins, and aromatic derivatives of acyclic olefins.

Cyclic olefins suitable for use in the second polymer component, in particular for embodiments designed for high temperature uses, include, but are not limited to, norbornene, tricyclodecene, dicyclopentadiene, tetracyclododecene, hexacycloheptadecene, tricycloundecene, pentacyclohexadecene, ethylidene norbornene (ENB), vinyl norbornene (VNB), norbornadiene, alkylnorbornenes, cyclopentene, cyclopropene, cyclobutene, cyclohexene, cyclopentadiene (CP), cyclohexadiene, cyclooctatriene, indene, any Diels-Alder adduct of cyclopentadiene and an acyclic olefin, cyclic olefin, or diene; and Diels-Alder adduct of butadiene and an acyclic olefin, cyclic olefin, or diene; vinylcyclohexene (VCH); alkyl derivatives of cyclic olefins; and aromatic derivatives of cyclic olefins.

Dienes suitable for use in the second polymer component include 1,4-hexadiene; 1,5-hexadiene; 1,5-heptadiene; 1,6-heptadiene; 1,6-octadiene; 1,7-octadiene; 1,9-decadiene; butadiene; 1,3-pentadiene; isoprene; 1,3-hexadiene; 1,4-pentadiene; p-divinylbenzene; alkyl derivatives of dienes; and aromatic derivatives of dienes. Suitable acyclic olefin copolymers for use as the second polymer component of the present composition include high density polyethylene (HDPE); low density polyethylene (LDPE); linear low density polyethylene (LLDPE); isotactic polypropylene (iPP); atactic polypropylene (aPP); syndiotactic polypropylene (sPP); poly(1-butene); poly(isobutylene); butyl rubber; poly(butadiene); poly(3-methyl-1-pentene); poly(4-methyl-1-pentene); poly(1-hexene); semi-crystalline ethylene-propylene copolymers; amorphous ethylene-propylene copolymers; semi-crystalline propylene-ethylene copolymers; semi-crystalline copolymers of ethylene with alpha-olefins; semi-crystalline copolymers of ethylene with isobutylene or 2-butene; semi-crystalline copolymers of ethylene with vinylaromatics; semi-crystalline copolymers of ethylene with dienes such as hexadiene, vinylcyclohexene, and 7-methyl-1,6-octadiene; semi-crystalline copolymers of propylene with alpha-olefins; semi-crystalline copolymers of propylene with vinyl aromatics; semi-crystalline copolymers of propylene with vinyl aromatics; semi-crystalline copolymers of propylene with isobutene or 2-butene; semi-crystalline copolymers of propylene with dienes; in reactor blends of isotactic polypropylene with ethylene-propylene rubber or ethylene-propylene-diene terpolymers (ICPs); amorphous ethylene copolymers with alpha-olefins, vinyl aromatics, cyclic olefins, isobutene, 2-butene, or dienes; terpolymers of ethylene, alpha-olefins including propylene, and dienes; terpolymers of ethylene, alpha-olefins, and vinyl aromatics; terpolymers of ethylene, alpha-olefins, and cyclic olefins; polyolefins grafted to polystyrene; polyolefins grafted to cyclic olefin copolymers; polyolefins grafted to other polyolefins; terpolymers of propylene, another olefin, and dienes; amorphous copolymers of isobutene with isoprene; amorphous copolymers of isobutene and p-methylstyrene; polyolefins with double bonds that have been hydrogenated; polyolefins with double bonds that have been epoxidized or hydroxylated; polyolefins with double bonds that have been functionalized by electrophilic additions; any functionalized polyolefin; polyolefins with short and long chain branches, polyolefins which have been crosslinked through their double bonds; polyolefins which have been crosslinked through functional groups; and polyolefins that have been grafted using free radical addition reactions. Preferred second copolymers include ethylene propylene rubbers (EP rubbers). The term "EP rubber" means a copolymer of ethylene and propylene, and optionally one or more diene monomer(s)(as described above), where the ethylene content is from 25 to 80 wt %, the total diene content is up to 15 wt %, and the balance is propylene.

For certain embodiments (such as high temperature uses) at least a portion of the second polymer component should have a glass transition temperature below −30° C. These low glass transition temperature domains of the modifier remain ductile down to their glass transition temperatures and improve the low temperature notched Izod impact resistance and low temperature instrumented impact energy to the present composition. Preferably, the glass transition temperature of at least a portion of the polyolefin modifier is less than −40° C., more preferably less than −50° C. Preferably, all portions of the polyolefin modifier have these low glass transition temperatures and are available to toughen the brittle cyclic olefin copolymer phases.

In addition, for certain embodiments (such as high temperature uses) the second polymer component should contain no portion with a softening point above 30° C., and preferably, above 10° C. A softening point above 30° C. is due to a glass transition temperature above 30° C. or a melting temperature of a significant portion of the modifier above 30° C. They are detectable as transitions or peaks in a differential scanning calorimeter (DSC), a Vicat softening point, a softening point in a thermal mechanical analyzer (TMA), or a sudden loss of modulus of the polyolefin modifier in a differential mechanical thermal analysis (DMTA) experiment. They are undesirable because the softening modifier also leads to a detectable softening and a lowered high temperature modulus for the composition.

The cyclic olefin first copolymer used in certain embodiments of the present composition (such as high temperature uses) has a very high glass transition temperature and preferably should be processed at even higher temperatures. The second polymer modifier used in the composition should be stable at these high processing temperatures. It is therefore preferred that the modifier contains one or more anti-oxidants effective at stabilizing the modifier at these high processing temperatures. It is also preferred that the modifier contains a UV stabilizer to prevent damage during end use applications. Most preferred are polyolefin modifiers that contain no groups that are reactive at the processing temperatures used to blend and form the present compositions.

For certain embodiments (such as high temperature uses), in order for the second polymer modifier to effectively toughen the brittle cyclic olefin first copolymer, it is desirable that the domain size of the second copolymer is less than 1-2 μm, more preferably less than 1.0 μM, in average diameter. These small domains can be achieved, when the interfacial energy between the second polymer and the brittle cyclic olefin copolymer is very small, or is even zero. Minimal interfacial energy between two phases means that breaking a large domain up into smaller domains with more interfacial area is thermodynamically allowed. Compositions with very small or zero interfacial energies can be effectively mixed, and the polyolefin modifiers dispersed, by applying shear to the melted mixture. In order to achieve toughening for a cyclic olefin copolymer, the polyolefin modifier preferably has a zero or low interfacial energy with the first copolymer. According to Souheng Wu in Polymer Interface and Adhesion, Marcel Dekker, 1982, zero or low interfacial energies are achieved when the polarity of the polyolefin modifier and cyclic olefin copolymer are matched.

To match the polarities experimentally, surface energies or solubility parameters need to be measured for each polyolefin modifier and each cyclic olefin copolymer. Surprisingly, it has been found that determining Bicerano solubility parameters can quickly narrow the candidate polyolefin modifiers for a given target cyclic olefin copolymer. D. W. Van Krevelen in *Properties of Polymers, Their Correlation With Chemical Structure; Their Numerical Estimation and Prediction From Additive Group Contributions*, Elsevier, 1990 developed correlations between the functional groups present in a polymer chain and its experimental solubility parameter. These correlations worked fairly well but were limited to the set of polymers containing only the functional groups used in the original correlations. Jozef Bicerano extended these correlations in *Prediction of Polymer Properties, 3rd Edition*, Marcel Dekker, 2002, by replacing correlations with functional groups with correlations with graph theory indices. Graph theory indices depend only on how the polymer repeat units are bonded together and on the elements present in the repeat units. They can be calculated for any repeat unit and correlated well with solubility parameters. Bicerano has tabulated Bicerano solubility parameters for 121 common polymers in Table 5.2 of his book. These equations have also been programmed into the Synthia module of the Cerius$^2$ molecular modeling software package available from Accelerys. Using these Bicerano solubility parameters for both the cyclic olefin copolymers and polyolefin modifiers used in the ensuing Examples, the compositions with the highest room temperature (23° C.) notched Izod impact resistance always occur when the Bicerano solubility parameter of the polyolefin modifiers are between 0.0 and 0.6 $J^{0.5}/cm^{1.5}$ less than the Bicerano solubility parameters of the cyclic olefin copolymers. See FIGS. 2 and 4 of PCT/US07/014,381 (U.S. Ser. No. 11/820,739) for plots of room temperature (23° C.) notched Izod impact resistance versus differences in Bicerano solubility parameters (indicated as Est. Sol. Param.). Preferably, the Bicerano solubility parameter of the polyolefin modifier is between 0.1-0.5 $J^{0.5}/cm^{1.5}$, more preferably between 0.2-0.4 $J^{0.5}/cm^{1.5}$, less than the Bicerano solubility parameter of the cyclic olefin copolymer.

Preferred polyolefins can be purchased from ExxonMobil Chemical Company under the trade names Vistalon™, Exxelor™, Exact™, or Vistamaxx™, or they may be polymerized using vanadium, Ziegler-Natta, or metallocene catalysts by methods well known in the art.

Preferred EP rubbers useful as the second polymer in compositions described herein include, but are not limited to, those having one or more of the following properties:

1) ethylene content of 25 to 80 wt % (preferably 30 to 75 wt %, preferably 35 to 70 wt %, preferably 40 to 65 wt %); and/or
2) diene content (ASTM D 6047) of 15 wt % or less (preferably 12 wt % or less, preferably 9 wt % or less, preferably 6 wt % or less, preferably 3 wt % or less, preferably 0 wt %); and/or
3) density (ASTM D 1505) of 0.87 g/cm$^3$ or less (preferably 0.865 g/cm$^3$ or less, preferably 0.86 g/cm$^3$ or less, preferably 0.855 g/cm$^3$ or less); and/or
4) heat of fusion (DSC as described in PCT/US07/15486), if detected, of less than 20 J/g (preferably less than 15 J/g, preferably less than 10 J/g, preferably less than 5 J/g, preferably a heat of fusion is indiscernible); and/or
5) ethylene or propylene crystallinity (DSC as described in PCT/US07/15486), if measurable, of less than 10 wt % (preferably less than 7.5 wt %, preferably less than 5 wt %, preferably less than 2.5 wt %, preferably crystallinity is undetected); and/or
6) melting point ($T_m$, peak first melt) (DSC as described in PCT/US07/15486), if detected, of 60° C. or less (preferably 50° C. or less, preferably 40° C. or less, preferably 35° C. or less); and/or
7) glass transition temperature ($T_g$) (Dynamical Mechanical Analysis (DMA) as described in PCT/US07/15486) of −30° C. or less (preferably −40° C. or less, preferably −50° C. or less, preferably −60° C. or less); and/or
8) $M_w$ of 50,000 to 3,000,000 g/mol (Size Exclusion Chromatography (SEC) as described in PCT/US07/15486) (preferably 100,000 to 2,000,000 g/mol, preferably 200,000 to 1,000,000 g/mol); and/or
9) $M_w/M_n$ of 1.5 to 40 (SEC as described in PCT/US07/15486) (preferably 1.6 to 30, preferably 1.7 to 20, preferably 1.8 to 10, preferably 1.8 to 5, preferably 1.8 to 3, preferably 1.8 to 2.5); and/or
10) Mooney viscosity (ASTM D 1646), ML(1+4) @ 125° C., of 10 to 100 (preferably 15 to 10090, preferably 20 to 85).

Particularly preferred EP rubbers for use herein (including in high temperature uses) contain no diene (i.e., an ethylene-propylene copolymers). If diene is present (i.e., an ethylene-propylene-diene terpolymer), preferably the diene is a norbornene-derived diene such as ethylidene norbornene (ENB), vinylidene norbornene (VNB), or dicyclopentadiene (DCPD). Diene content is measured by ASTM D 6047.

The method of making the EP rubber is not critical, as it can be made by slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems or combinations thereof.

In a particularly preferred embodiment, the EP rubbers useful herein are produced using a vanadium-based catalyst system in a solution or slurry process. In another embodiment, the EP rubbers useful herein are produced using a metallocene-based catalyst system in a solution or slurry process. In yet another embodiment, the EP rubbers useful herein are produced using any single-sited catalyst system in a solution or slurry process. Preferably, the EP rubbers made by a vanadium, metallocene, or other single-sited catalyst system has a molecular weight distribution ($M_w/M_n$) of 1.8 to 2.5.

EP rubbers that are useful in this invention include those available from ExxonMobil Chemical (sold under the Vistalon™ tradename), including:

| ExxonMobil Chemical Vistalon ™ EP Rubbers | | | | |
|---|---|---|---|---|
| Grade | Mooney Viscosity (ML1 + 4, 125° C.) | Ethylene (wt %) | Diene (wt %) | Molecular Weight Distribution |
| 404 | 28 | 45 | — | very broad |
| 504 | 25 | 60 | — | broad |
| 606 | 65 | 54 | — | broad |
| 703 | 21 | 73 | — | narrow |
| 706 | 42 | 65 | — | bimodal |
| 707 | 23 | 72 | — | very broad |
| 722 | 16 | 72 | — | narrow |
| 785 | 30 | 49 | — | narrow |
| 805 | 33 | 78 | — | narrow |
| 878 | 51 | 60 | — | narrow |
| MDV 91-9 | 18 | 59 | — | narrow |
| 1703P | 25 | 77 | 0.9 VNB | very broad |
| 2727 | 44 | 57 | 2.0 ENB | broad |
| 3708 | 52 | 70 | 3.4 ENB | broad |
| 2504 | 25 | 58 | 4.7 ENB | broad |
| 2727 | 44 | 56 | 2.0 ENB | broad |
| 4600 | 90 | 60 | 4.5 ENB | bimodal |
| 4709 | 78 | 75 | 4.4 ENB | narrow |
| 5504 | 25 | 45 | 4.7 ENB | medium |
| 5601 | 72 | 68 | 5.0 ENB | tailored |
| 6505 | 53 | 57 | 9.2 ENB | broad |
| 7000 | 59 | 73 | 5.0 ENB | narrow |
| 7001 | 60 | 73 | 5.0 ENB | tailored |
| 7500 | 82 | 56 | 5.7 ENB | bimodal |
| 7800(P) | 20 | 79 | 6.0 ENB | bimodal |
| 8600 | 81 | 58 | 8.9 ENB | bimodal |
| 8609 | 83 | 68 | 8.0 ENB | bimodal |
| 8800 | 15 | 73 | 10.0 | bimodal |
| 9500 | 72 | 60 | 11.0 | bimodal |

VNB is vinyl norbornene, ENB is ethylidene norbornene.

In a particularly preferred embodiment, the second component used herein comprises an elastomeric polymer material or materials. Such materials are frequently amorphous polyolefins or polydienes made up of monomeric units which can be derived from a wide variety of sources. These elastomeric materials serve to impart favorable impact resistance properties to the polymeric compositions in which they are included.

Preferred elastomeric polymers used herein desirably have a glass transition temperature, $T_g$, of from −80° C. to 0° C., alternatively from −75° C. to −2.5° C., or even from −70° C. to −5.0° C. The elastomeric polymer materials used herein are defined as "elastomeric" for purposes of the present disclosure if they exhibit glass transition temperature ($T_g$) values of 0° C. or less.

The elastomeric polymer materials used as components in the polymer compositions herein can be fashioned form a wide variety of olefinic monomers. They can, for example, be comprised of monomeric units derived from α-olefins; other linear or non-linear, acyclic, aliphatic or aromatic mono-olefins; cyclic or polycyclic mono-olefins; conjugated or non-conjugated, linear or non-linear, acyclic, cyclic or polycyclic dienes; or combinations of these monomer types. These elastomeric materials can be homopolymers or random or block copolymers and may also be grafted onto other types of organic moieties. A number of elastomeric polymer materials of the type which are useful herein are described in greater detail in U.S. Pat. No. 4,918,133 which is incorporated herein by reference.

One class of useful elastomeric polymers which can be utilized herein is represented by flexible random copolymers comprising an ethylene component, a cycloolefin component and an α-olefin component having 3 to 20 carbon atoms. The ethylene-derived units in such random copolymers can comprise from 40 mole % to 99 mole % of the copolymer. Typically, these copolymers have a $T_g$ of from −80 to 0° C., preferably from −75 to −2.5° C., preferably from −70 to −5° C.

The cycloolefins used to form such copolymers can, for example, be selected from bicyclo[2,2,1]hept-2-ene; 5,10-dimethyltetracyclo[4,4,0,1$^{2.5}$,1$^{7.10}$]-3-dodecene; hexacyclo[6,6,1,1$^{3.6}$,1$^{10.13}$,0$^{2.7}$,0$^{9.14}$]-4-heptadecene; pentacyclo[6,5,1,1$^{3.6}$,0$^{2.7}$,0$^{9.13}$]-4-pentadecene; pentacyclo[6,5,1,1$^{3.6}$,0$^{2.7}$, 0$^{9.13}$]-4-hexadecene; tricyclo[4,3,0,1$^{2.5}$]-3-decene; and substituted derivatives of these cycloolefins. Random repeating units derived from these cycloolefin materials can comprise from 1 mole % to 40 mole % of this type of elastomeric polymer component.

The $C_3$ to $C_{20}$ α-olefins used to form such copolymers can, for example, be selected from propylene, 1-butene, 1-pentene, 1-hexene, 4-methyl-1-pentene, 1-octene, 1-dodecene, 1-tetradecene, 1-hexadecene, 1-octadecene, 1-eicosene and mixtures thereof. Random repeating units derived from these $C_3$ to $C_{20}$ α-olefin materials can comprise from 1 mole % to 45 mole % of this type of elastomeric polymer component.

Another class of useful elastomeric polymers which can be utilized in the polymer compositions herein is represented by amorphous or low-crystalline flexible olefinic copolymers (e.g. those having an $H_f$ (DSC as described in PCT/US07/15486), if detected, of less than 50 J/g, alternately less than 40 J/g, alternately less than 30 J/g, alternately less than 20 J/g, alternately less than 10 J/g, alternately less than 5 J/g, alternately indiscernible (e.g. zero)) comprising at least two components selected from the group consisting of an ethylene component, a propylene component, and an α-olefin component having 4 to 20 carbon atoms. Such copolymers are in general ethylene-propylene copolymer rubbers, ethylene-α-olefin copolymer rubbers and propylene-α-olefin copolymer rubbers. The α-olefin in such copolymer rubbers can be selected, for example, from 1-butene, 1-pentene, 1-hexene, 4-methyl-1-pentene, 1-octene and 1-decene.

In another embodiment the amorphous or low-crystalline flexible olefinic copolymers exhibit crystallinity (DSC as described in PCT/US07/15486), if measurable, of less than 10 wt % (alternately less than 7.5 wt %, alternately less than 5 wt %, alternately undetected (e.g. no discernable $T_m$ on the DSC trace)). The percent crystallinity is calculated using the formula, [area under the curve (Joules/gram)/B (Joules/gram)]*100, where B is the $T_m$ heat of fusion for the homopolymer of the major monomer component. The values for B are obtained from the Polymer Handbook, Fourth Edition, published by John Wiley and Sons, New York 1999, except that a value of 189 J/g is used as the heat of fusion for 100% crystalline polypropylene and a value of 290 J/g is used for the heat of fusion for 100% crystalline polyethylene.

The molar ratio of ethylene to α-olefin in the ethylene-α-olefin copolymer rubbers can vary depending on the types of the α-olefins, but is generally in the range of from 30/70 to 95/5, or even from 50/50 to 95/5. When the α-olefin is propylene, this molar ratio is generally in the range of from 50/50 to 90/10, while when the α-olefins are those of four or more carbon atoms, this molar ratio is generally in the range of from 80/20 to 95/5.

The molar ratio of propylene to α-olefin in the propylene-α-olefin copolymer rubbers can also vary depending on the types of the α-olefins, but is generally in the range of from 50/50 to 95/5. When the α-olefin is 1-butene, this molar ratio is generally in the range of from 50/50 to 90/10, while when the a-olefins are those of five or more carbon atoms, this molar ratio is generally in the range of from 80/20 to 95/5.

The ethylene, propylene, and α-olefin copolymer rubbers hereinbefore described may also be graft-modified in conventional fashion with, for example, from 0.01 wt % to 5 wt %, or even from 0.1 wt % to 4 wt %, of graft monomers selected from unsaturated carboxylic acids or derivatives thereof. Examples of the unsaturated carboxylic acids and derivatives thereof which can used for modification of the ethylene-propylene-α-olefin copolymer rubbers herein can include such unsaturated carboxylic acids as acrylic acid, maleic acid, fumaric acid, tetrahydrophthalic acid, itaconic acid, citraconic acid, crotonic acid, isocrotonic acid, and nadic Acid™ (endo-cis-bicyclo[2,2,1]hept-5-ene-2,3-dicarboxylic acid), and derivatives thereof such as acid halides, amides, imides, anhydrides, and esters. Specific examples of these acid derivatives include malenyl chloride, maleimide, maleic anhydride, citraconic anhydride, monomethyl maleate, dimethyl maleate, and glycidyl maleate. Among these materials, unsaturated dicarboxylic acids and derivatives thereof such as acid anhydrides thereof are especially useful. Maleic acid, nadic Acid™ and anhydrides thereof are specific examples of this type of acid materials.

Another class of useful elastomeric polymers which can be utilized in the polymer compositions herein is represented by flexible olefin/nonconjugated diene copolymers comprising a nonconjugated diene component and at least two components selected from the group consisting of an ethylene component, a propylene component, and α-olefin components having 4 to 20 carbon atoms. Such copolymers are in general ethylene-propylene-diene monomer (EPDM) copolymer rubbers, ethylene-α-olefin-diene copolymer rubbers and propylene-α-olefin-diene copolymer rubbers. Examples of α-olefins which can be used in these olefin-diene copolymers include the same materials listed hereinbefore for the ethylene and propylene copolymer rubbers.

Examples of the diene components for the ethylene-propylene-diene copolymer rubbers, ethylene-α-olefin-diene copolymer rubbers, or the propylene-α-olefin-diene copolymer rubbers include acyclic linear or branched non-conjugated dienes, such as 1,4-hexadiene, 1,6-octadiene, 2-methyl-1,5-hexadiene, 6-methyl-1,5-heptadiene, and 7-methyl-1,6-octadiene; and cyclic non-conjugated dienes such as 1,4-cyclohexadiene, dicyclopentadiene, 4-vinyl-1-cyclohexene, methyltetrahydroindenes, 5-vinyl-2-norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidiene-5-norbornene, and 2-propenyl-2,2-norbornadiene. Among these materials, 7-methyl-1,6-octadiene, 1,4-hexadiene, 1,6-octadiene, and cyclic non-conjugated dienes such as 5-ethylidene-2-norbornene, 5-vinyl-2-norbornene, 5-methylene-2-norbornene, and 4-vinyl-1-cyclohexene are especially useful.

The molar ratio of ethylene to α-olefin in the ethylene-α-olefin-diene copolymer rubbers can vary depending on the types of the α-olefins, but is generally in the range of from 50/50 to 95/5. When the α-olefin is propylene, this molar ratio is generally in the range of from 50/50 to 90/10. When the α-olefins are those of four or more carbon atoms, this molar ratio is generally in the range of from 80/20 to 95/5. The content of the diene component in the ethylene-propylene-diene or ethylene-α-olefin-diene copolymer rubbers is generally in the range of from 0.5 to 10 mole %, or even from 0.5 to 5 mole %.

The molar ratio of propylene to α-olefin in the propylene-α-olefin-diene copolymer rubbers can vary depending on the types of the α-olefins, but is generally in the range of from 50/50 to 95/5. When the α-olefin is 1-butene, this molar ratio is generally in the range of from 50/50 to 90/10. When the α-olefins are those of five or more carbon atoms, this molar ratio is generally in the range of from 80/20 to 95/5. The content of the diene component in the propylene-α-olefin-diene copolymer rubbers is generally in the range of from 0.5 to 10 mole %, or even from 0.5 to 5 mole %.

Another class of useful elastomeric polymers which can be utilized in the polymer compositions herein is represented by flexible diene/aromatic vinyl copolymers selected from the group consisting of random copolymers and block copolymers, each said copolymer comprising a conjugated diene component and an aromatic vinyl hydrocarbon component, as well as the hydrogenation products of these copolymers. Such copolymers are most commonly represented by styrene-butadiene block copolymer rubbers, (d) styrene-butadiene-styrene block copolymer rubbers, (e) styrene-isoprene block copolymer rubbers, (f) styrene-isoprene-styrene block copolymer rubbers, (g) hydrogenated styrene-butadiene-styrene block copolymer rubbers, (h) hydrogenated styrene-isoprene-styrene block copolymer rubbers, and (i) maleated or otherwise functionalized and/or grafted derivatives of such copolymer rubbers (SBCs).

The molar ratio of styrene to butadiene in the styrene-butadiene block copolymer rubbers can generally be in the range of from 1/99 to 60/40. The molar ratio of styrene to butadiene in the styrene-butadiene-styrene block copolymer rubbers can generally be in the range of from 1/99 to 60/40. The degree of polymerization of styrene in each block can generally be in the range of from 10 to 5,000, and the degree of polymerization of butadiene in each block can generally be in the range of from 10 to 20,000.

The molar ratio of styrene to isoprene in the styrene-isoprene block copolymer rubbers can generally be in the range of from 1/99 to 60/40. The molar ratio of styrene to isoprene in the styrene-isoprene-styrene block copolymer rubbers can generally be in the range of from 1/99 to 60/40. The degree of polymerization of styrene in each block can generally be in the range of from 1 to 5,000, and the degree of polymerization of isoprene in each block can generally be in the range of from 10 to 20,000.

The hydrogenated styrene-butadiene-styrene block copolymer rubbers are copolymer rubbers wherein double bonds left in the styrene-butadiene-styrene block copolymer rubbers are partially hydrogenated and the weight ratio of styrene to butadiene-derived component can generally be in the range of from 1/99 to 50/50. The hydrogenated styrene-isoprene-styrene block copolymer rubbers are copolymer rubbers wherein double bonds left in the styrene-isoprene-styrene block copolymers are partially hydrogenated and the weight ratio of styrene to isoprene-derived component can generally be in the range of from 1/99 to 50/50.

The aromatic vinyl hydrocarbon-conjugated diene block copolymers useful herein can have a weight-average molecular weight, $M_w$, as measured by GPC which ranges from 500 g/mole to 2,000,000 g/mole, or even from 10,000 g/mole to 1,000,000 g/mole. The density of these block copolymers can range from 0.80 to 1.10 g/cm$^3$, or even from 0.88 to 0.96 g/cm$^3$.

Another class of useful elastomeric polymers which can be utilized in the polymer compositions herein is represented by amorphous or low-crystalline homopolymers, as well as the hydrogenation products of these homopolymers. Such homopolymers and hydrogenated homopolymers can include, for example, substantially atactic polypropylene, polybutadiene, polyisoprene, hydrogenated polybutadiene and hydrogenated polyisoprene. These homopolymers and hydrogenated homopolymers useful herein can have a weight-average molecular weight, $M_w$, as measured by GPC which ranges from 500 g/mole to 2,000,000 g/mole, or even from 10,000 g/mole to 1,000,000 g/mole.

The aromatic vinyl/non-conjugated diene copolymers and the elastomeric homopolymers hereinbefore described, like the ethylene, propylene, and α-olefin copolymer rubbers, can also be graft-modified in conventional fashion with, for example, from 0.01 wt % to 5 wt %, or even from 0.1 wt % to 4 wt %, of graft monomers selected from unsaturated carboxylic acids or derivatives thereof. Suitable acids and acid derivatives for such graft modification are the same as those hereinbefore described with respect to modification of the ethylene, propylene, and α-olefin copolymer rubbers.

The hereinbefore-described various types of elastomeric polymers which are useful for this particularly preferred embodiment herein are all known materials. They can be prepared in conventional manner by polymerizing the appropriate types and amounts of their constituent comonomers using standard polymerization techniques. Many of these elastomeric materials are commerically available and can thus be readily obtained for use in the polymer compositions herein. Elastomers particularly useful for this particularly preferred embodiment herein, for example, are marketed under the tradenames Vistalon™ (ethylene/propylene/5-ethylidene-2-norbornene terpolymer), Vector™ (styrene-butadiene triblock copolymer), Kraton™ (styrene-hydrogenated butadiene diblock copolymer), and Exxelor™ (maleated ethylene-propylene copolymer).

Non-Functionalized Plasticizers (NFPs)

For the non-functionalized plasticizer components described herein, kinematic viscosity (KV), also referred to merely as viscosity, is expressed as centistokes (cSt) and is determined at the temperature specified according to ASTM D445 (e.g., $KV_{100}$ at 100° C., $KV_{40}$ at 40° C.). Glass transition temperature ($T_g$) is determined according to ASTM E 1356. Distillation range is determined according to ASTM D 86. Initial boiling point and final boiling point are each determined according to ASTM D 86. Pour point is determined according to ASTM D 97. Specific gravity is determined according to ASTM D 4052, 15.6° C. Flash point is determined according to ASTM D 56. Dielectric constant is determined at 1 kHz, 20° C. Density is determined according to ASTM 4052, 15.6° C. Viscosity index is determined according to ASTM D-2270. Number average molecular weight ($M_n$) of the NFP is determined by GC or GPC as described in PCT/US07/15486.

NFPs useful herein are compounds comprising carbon and hydrogen, and do not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent", it is meant that these groups and compounds comprising these groups are not deliberately added to the NFP, and if present at all, are present at less than 5 wt % by weight of the NFP in one embodiment, more preferably less than 4 weight %, more preferably less than 3 weight %, more preferably less than 2 weight %, more preferably less than 1 weight %, more preferably less than 0.7 weight %, more preferably less than 0.5 weight %, more preferably less than 0.3 weight %, more preferably less than 0.1 weight %, more preferably less than 0.05 weight %, more preferably less than 0.01 weight %, more preferably less than 0.001 weight %, based upon the weight of the NFP.

In a preferred embodiment, the NFP is a hydrocarbon that contains olefinic unsaturation to an unappreciable extent. By "unappreciable extent of olefinic unsaturation" it is meant that the carbons involved in olefinic bonds account for less than 10% (preferably less than 8%, preferably less than 6%, preferably less than 4%, preferably less than 2%, preferably less than 1%, preferably less than 0.7%, preferably less than 0.5%, preferably less than 0.3%, preferably less than 0.1%, preferably less than 0.05%, preferably less than 0.01%, preferably less than 0.001%) of the total number of carbons. In some embodiments, the percent of carbons of the NFP involved in olefinic bonds is between 0.001 and 10% of the total number of carbon atoms in the NFP (preferably between 0.01 and 5%, preferably between 0.1 and 2%, preferably less than 1%).

Preferred NFP's that may be used herein (typically present in the composition at from 0.1 to 50 wt %, preferably from 0.25 to 45 wt %, preferably from 0.5 to 40 wt %, preferably 1 wt % to 35 wt %, preferably 3 to 30 wt %, based upon the weight of the blend), have: 1) a pour point of 0° C. or less, preferably −10° C. or less, more preferably −20° C. or less, more preferably −25° C. or less, 2) a $KV_{100}$ of 3 cSt or more, preferably 5 cSt or more, more preferably 10 cSt or more (preferably from 3 to 1000 cSt, preferably from 5 to 500 cSt, preferably from 4 to 200 cSt, more preferably from 10 to 100 cSt), and, 3) optionally, a flash point of 200° C. or more, preferably 210° C. or more, preferably 220° C. or more, and, 4) optionally, a viscosity index of 100 or more, preferably 120 or more, preferably 140 or more, and 5) optionally a specific gravity (15.6/15.6° C.) of 0.86 or less (preferably 0.855 or less, preferably 0.85 or less, preferably 0.84 or less.

Particularly preferred NFPs include: a) liquid polyalphaolefins (PAOs), b) Group III Mineral Oils, and c) high purity hydrocarbon fluids derived from a so-called Gas-To-Liquids process; said NFP's having a viscosity index greater than 100 (preferably greater than 120), a pour point less than −15° C. (preferably less than −20° C.), a specific gravity less than 0.86 (preferably less than 0.855), and a flash point greater than 200° C. (preferably greater than 230° C.).

a) Polyalphaolefins:

In another embodiment of the present invention, the NFP comprises a polyalphaolefin (PAO) liquid with a pour point of −10° C. or less and a kinematic viscosity at 100° C. of 3 cSt or more. In general, a PAO liquid comprises hydrocarbon oligomers manufactured by catalytic oligomerization of alpha-olefins, preferably linear alpha-olefins. A PAO may be characterized by any type of tacticity, including isotactic or syndiotactic and/or atactic, and by any degree of tacticity, including isotactic-rich or syndiotactic-rich or fully atactic. PAO liquids are described in, for example, U.S. Pat. No. 3,149,178; U.S. Pat. No. 4,827,064; U.S. Pat. No. 4,827,073; U.S. Pat. No. 5,171,908; and U.S. Pat. No. 5,783,531 and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), p. 3-52.

PAO liquids are typically prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+ $TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts).

In one embodiment, the PAO comprises $C_{15}$ to $C_{1500}$ (preferably $C_{20}$ to $C_{1000}$, preferably $C_{30}$ to $C_{800}$, preferably $C_{35}$ to $C_{400}$, most preferably $C_{40}$ to $C_{250}$) oligomers of alpha-olefins. These oligomers are dimers, trimers, tetramers, pentamers, etc. In another embodiment, the PAO comprises $C_3$ to $C_{24}$ (preferably $C_5$ to $C_{18}$, preferably $C_6$ to $C_{14}$, even preferably $C_8$ to $C_{12}$, most preferably $C_{10}$) branched or linear alpha-olefins, provided that $C_3$ and $C_4$ alpha-olefins are present at 10 wt % or less. In another embodiment, the PAO comprises $C_3$ to $C_{24}$ (preferably $C_5$ to $C_{18}$, preferably $C_6$ to $C_{14}$, most preferably $C_8$ to $C_{12}$) linear alpha-olefins (LAOs), provided that $C_3$ and $C_4$ LAOs are present at 10 wt % or less. Suitable olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred.

In one embodiment, a single LAO is used to prepare the oligomers. In this case, a preferred embodiment involves the oligomerization of 1-decene, and the PAO is a mixture of oligomers (including, for example, dimers, trimers, tetramers, pentamers, and higher) of 1-decene. In another embodiment, the PAO comprises oligomers of two or more $C_3$ to $C_{18}$ LAOs (preferably $C_5$ to $C_{18}$ LAOs), to make 'bipolymer' or 'terpolymer' or higher-order copolymer combinations, provided that ethylene and $C_3$ and $C_4$ LAOs are present at 10 wt % or less. In this case, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In another embodiment, the PAO comprises oligomers of a single alpha-olefin species having a carbon number of 5 to 24 (preferably 6 to 18, preferably 8 to 12, most preferably 10). In another embodiment, the NFP comprises oligomers of mixed alpha-olefins (i.e., involving two or more alpha-olefin species), each alpha-olefin having a carbon number of 3 to 24 (preferably 5 to 24, preferably 6 to 18, most preferably 8 to 12), provided that alpha-olefins having a carbon number of 3 or 4 are present at 10 wt % or less. In a particularly preferred embodiment, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In another embodiment, the PAO comprises oligomers of one or more a-olefin with repeat unit formulas of: —[CHR—$CH_2$]— where R is a $C_3$ to $C_{18}$ saturated hydrocarbon branch. Preferably, R is constant for all oligomers. In another embodiment, there is a range of R substituents covering carbon numbers from 3 to 18. Preferably, R is linear, i.e., R is $(CH_2)_zCH_3$, where z is 2 to 17 (preferably 3 to 11, preferably 4 to 9). Optionally, R may contain one methyl or ethyl branch, i.e., R is $(CH_2)_m[CH(CH_3)](CH_2)_nCH_3$ or $(CH_2)_x[CH(CH_2CH_3)](CH_2)_yCH_3$, where (m+n) is 1 to 15 (preferably 1 to 9, preferably 3 to 7) and (x+y) is 1 to 14 (preferably 1 to 8, preferably 2 to 6). Preferably m>n. Preferably m is 0 to 15 (preferably 2 to 15, preferably 3 to 12, preferably 4 to 9) and n is 0 to 10 (preferably 1 to 8, preferably 1 to 6, preferably 1 to 4). Preferably x>y. Preferably x is 0 to 14 (preferably 1 to 14, preferably 2 to 11, preferably 3 to 8) and y is 0 to 10 (preferably 1 to 8, preferably 1 to 6, preferably 1 to 4.) Preferably, the repeat units are arranged in a head-to-tail fashion with minimal heat-to-head connections.

The PAO may be atactic, isotactic, or syndiotactic. In one embodiment, the PAO has essentially the same population of meso [m] and racemic [r] dyads (preferably neither [m] nor [r] greater than 60%, preferably neither greater than 55%) as measured by $^{13}$C-NMR, making it atactic. In another embodiment, the PAO has more than 60% (preferably more than 70%, preferably more than 80%, preferably more than 90%) meso dyads [m]. In another embodiment, the PAO has more than 60% (preferably more than 70%, preferably more than 80%, preferably more than 90%) racemic dyads [r]. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

In some embodiments, preferred PAOs have a "branching ratio" as defined in U.S. Pat. No. 4,827,064 and measured according to the method described therein, of 0.20 or less (preferably 0.19 or less, preferably 0.18 or less, preferably 0.17 or less, preferably 0.15 or less, preferably 0.12 or less, preferably 0.10 or less).

In one embodiment of the present invention, the PAO has a number average molecular weight of from 100 to 20,000 g/mol (preferably 300 to 15,000 g/mol, preferably 400 to 10,000 g/mol, preferably 500 to 5,000 g/mol, preferably 600 to 3,000 g/mol, preferably 600 to 1,500 g/mol). $M_n$ for the NFP's is determined by GC or GPC as described in PCT/US07/15486.

In a preferred embodiment, the PAO has a kinematic viscosity at 100° C. of 3 cSt or more (preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt more). In another embodiment, the PAO has a kinematic viscosity at 100° C. of 300 cSt or less (preferably 100 cSt or less). In another embodiment, the PAO has a kinematic viscosity at 100° C. of 3 to 3,000 cSt (preferably 4 to 1,000 cSt, preferably 6 to 300 cSt, preferably 8 to 150 cSt, preferably 8 to 100 cSt, preferably 8 to 40 cSt). In another embodiment, the PAO has a kinematic viscosity at 100° C. of 10 to 1000 cSt (preferably 10 to 300 cSt, preferably 10 to 100 cSt). In yet another embodiment, the PAO has a kinematic viscosity at 100° C. of 4 to 8 cSt.

In another preferred embodiment, the PAO has a Viscosity Index of 120 or more (preferably 130 or more, preferably 140 or more, preferably 150 or more, preferably 170 or more, preferably 190 or more, preferably 200 or more, preferably 250 or more, preferably 300 or more). In another embodiment, the PAO or blend of PAOs has a viscosity Index of 120 to 350 (preferably 130 to 250).

In yet another preferred embodiment, the PAO has a pour point of −10° C. or less (preferably −20° C. or less, preferably −25° C. or less, preferably −30° C. or less, preferably −35° C. or less, preferably −40° C. or less, preferably −50° C. or less). In another embodiment, the PAO or blend of PAOs has a pour point of −15 to −70° C. (preferably −25 to −60° C.).

In yet another preferred embodiment, the PAO has a glass transition temperature ($T_g$) of −40° C. or less (preferably −50° C. or less, preferably −60° C. or less, preferably −70° C. or less, preferably −80° C. or less). In another embodiment, the PAO or blend of PAOs has a $T_g$ of −50 to −120° C. (preferably −60 to −100° C., preferably −70 to −90° C.).

In yet another preferred embodiment, the PAO has a flash point of 200° C. or more (preferably 210° C. or more, preferably 220° C. or more, preferably 230° C. or more), preferably between 240° C. and 290° C.

In yet another preferred embodiment, the PAO has a specific gravity (15.6/15.6° C.) of 0.86 or less (preferably 0.855 or less, preferably 0.85 or less, preferably 0.84 or less).

Particularly preferred PAOs are those having A) a flash point of 200° C. or more (preferably 210° C. or more, preferably 220° C. or more, preferably 230° C. or more); and B) a pour point less than −20° C. (preferably less than −25° C., preferably less than −30° C., preferably less than −35°, preferably less than −40° C.) and/or a kinematic viscosity at 100° C. of 10 cSt or more (preferably 35 cSt or more, preferably 40 cSt or more, preferably 50 cSt or more).

Further preferred PAOs have a kinematic viscosity at 100° C. of at least 3 cSt (preferably at least 6 cSt, preferably at least 8 cSt, most preferably at least 10 cSt); a viscosity index of at least 120 (preferably at least 130, preferably at least 140, most preferably at least 150); a pour point of −10° C. or less (preferably −20° C. or less, preferably −30° C. or less, most preferably −40° C. or less); and a specific gravity (15.6/15.6° C.) of 0.86 or less (preferably 0.855 or less, preferably 0.85 or less, most preferably 0.84 or less).

The PAO may be comprised of one or more distinct PAO components.

In one embodiment, the NFP is a blend of one or more PAOs with different compositions (e.g., different α-olefin(s) were used to make the oligomers) and/or different physical properties (e.g., kinematic viscosity, pour point, viscosity index, and/or glass transition temperature).

Desirable PAOs are available as SpectraSyn™ and SpectraSyn Ultra™ from ExxonMobil Chemical in Houston, Tex. (previously sold under the SHF and SuperSyn™ tradenames by ExxonMobil Chemical Company), some of which are summarized in the table below. Other useful PAOs include Synfluid™ available from ChevronPhillips Chemical Company (Pasedena, Tex.), Durasyn™ available from Innovene (Chicago, Ill.), Nexbase™ available from Neste Oil (Keilaniemi, Finland), and Synton™ available from Chemtura Corporation (Middlebury, Conn.). The percentage of carbons in chain-type paraffinic structures ($C_p$) is close to 100% (typically greater than 98% or even 99%) for PAOs.

| SpectraSyn™ Series Polyalphaolefins | | | | | |
|---|---|---|---|---|---|
| Grade ID | KV @ 100° C., cSt | KV @ 40° C., cSt | VI | Pour Point, ° C. | Specific gravity | Flash Point, ° C. |
| 4 | 4 | 19 | 126 | −66 | 0.820 | 220 |
| Plus 4 | 4 | 17 | 122 | −60 | 0.820 | 228 |
| 6 | 6 | 31 | 138 | −57 | 0.827 | 246 |
| Plus 6 | 6 | 30 | 140 | −54 | 0.827 | 246 |
| 8 | 8 | 48 | 139 | −48 | 0.833 | 260 |
| 10 | 10 | 66 | 137 | −48 | 0.835 | 266 |
| 40 | 39 | 396 | 147 | −36 | 0.850 | 281 |
| 100 | 100 | 1240 | 170 | −30 | 0.853 | 283 |
| Ultra 150 | 150 | 1,500 | 218 | −33 | 0.850 | >265 |
| Ultra 300 | 300 | 3,100 | 241 | −27 | 0.852 | >265 |
| Ultra 1000 | 1,000 | 10,000 | 307 | −18 | 0.855 | >265 | b) High Purity Hydrocarbon Fluids:

In another embodiment, the NFP is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant basestock or oil, which includes: hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of 20 or more; and hydroisomerized synthetic waxes, such as Fischer-Tropsch waxes (i.e., the high boiling point residues of Fischer-Tropsch synthesis, including waxy hydrocarbons); or mixtures thereof. Most preferred are lubricant basestocks or oils derived from hydrocarbons synthesized in a Fischer-Tropsch process as part of an overall Gas-to-Liquids (GTL) process.

In a preferred embodiment, the mixture of paraffins has two or more of the following properties:

1. a naphthenic content (ASTM D 2140) of less than 40 wt % (preferably less than 30 wt %, preferably less than 20 wt %, preferably less than 15 wt %, preferably less than 10 wt %, preferably less than 5 wt %, preferably less than 2 wt %, preferably less than 1 wt %) based on the total weight of the hydrocarbon mixture; and/or 2. a normal paraffins (ASTM D 2140) content of less than 5 wt % (preferably less than 4 wt %, preferably less than 3 wt %, preferably less than 1 wt %) based on the total weight of the hydrocarbon mixture; and/or 3. an aromatic content (ASTM D 2140) of 1 wt % or less (preferably 0.5 wt % or less); and/or 4. a saturates (ASTM D 2007) level of 90 wt % or higher (preferably 95 wt % or higher, preferably 98 wt % or higher, preferably 99 wt % or higher); and/or 5. the percentage of carbons in chain-type paraffinic structures ($C_P$) of 80% or more (preferably 90% or more, preferably 95% or more, preferably 98% or more); and/or 6. a branched paraffin:normal paraffin ratio greater than 10:1 (preferably greater than 20:1, preferably greater than 50:1, preferably greater than 100:1, preferably greater than 500:1, preferably greater than 1000:1); and/or 7. sidechains with 4 or more carbons making up less than 10% of all sidechains (preferably less than 5%, preferably less than 1%); and/or 8. sidechains with 1 or 2 carbons making up at least 50% of all sidechains (preferably at least 60%, preferably at least 70%, preferably at least 80%, preferably at least 90%, preferably at least 95%, preferably at least 98%); and/or 9. a sulfur content (ASTM D2622) of 300 ppm or less (preferably 100 ppm or less, preferably 50 ppm or less, preferably 10 ppm or less) where ppm is on a weight basis; and/or 10. a nitrogen content (ASTM 4629) of 300 ppm or less (preferably 100 ppm or less, preferably 50 ppm or less, preferably 10 ppm or less) where ppm is on a weight basis; and/or 11. a number-average molecular weight of 300 to 1800 g/mol (preferably 400 to 1500 g/mol, preferably 500 to 1200 g/mol, preferably 600 to 900 g/mol); and/or 12. a kinematic viscosity at 40° C. of 10 cSt or more (preferably 25 cSt or more, preferably between 50 and 400 cSt); and/or 13. a kinematic viscosity at 100° C. ranging from 3 to 50 cSt (preferably 3 to 30 cSt, preferably 5 to 25 cSt, preferably 6 to 20 cSt, preferably 8 to 16 cSt); and/or 14. a viscosity index (VI) of 100 or greater, preferably 120 or greater, preferably 130 or greater, preferably 140 or greater, preferably 150 or greater, preferably 160 or greater, preferably 180 or greater); and/or
15. a pour point of −5° C. or lower (preferably −10° C. or lower, preferably −15° C. or lower, preferably −20° C. or lower, preferably −25° C. or lower, preferably −30° C. or lower); and/or
16. a flash point of 200° C. or more (preferably 220° C. or more, preferably 240° C. or more, preferably 260° C. or more); and/or
17. a specific gravity (15.6° C./15.6° C.) of 0.86 or less (preferably 0.85 or less, preferably 0.84 or less); and/or
18. an aniline point (ASTM D 611) of 120° C. or more; and/or
19. a bromine number of 1 or less, (ASTM D 1159 (or ASTM D 2710 if so directed by ASTM D 1159)).

In a preferred embodiment, the mixture of paraffins comprises a GTL basestock or oil. GTL basestocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and $H_2$) derived from a suitable source, such as natural gas and/or coal. GTL basestocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL basestocks and oils may further comprise other hydroisomerized basestocks and base oils. Particularly preferred GTL basestocks or oils are those comprising mostly hydroisomerized F-T waxes and/or other liquid hydrocarbons obtained by a F-T synthesis process.

The synthesis of hydrocarbons, including waxy hydrocarbons, by F-T may involve any suitable process known in the art, including those involving a slurry, a fixed-bed, or a fluidized-bed of catalyst particles in a hydrocarbon liquid. The catalyst may be an amorphous catalyst, for example based on a Group VIII metal such as Fe, Ni, Co, Ru, and Re on a suitable inorganic support material, or a crystalline catalyst, for example a zeolitic catalyst. The process of making a lubricant basestock or oil from a waxy stock is characterized as a hydrodewaxing process. A hydrotreating step, while typically not required for F-T waxes, can be performed prior to hydrodewaxing if desired. Some F-T waxes may benefit from removal of oxygenates while others may benefit from oxygenates treatment prior to hydrodewaxing. The hydrodewaxing process is typically conducted over a catalyst or combination of catalysts at high temperatures and pressures in the presence of hydrogen. The catalyst may be an amorphous catalyst, for example based on Co, Mo, W, etc. on a suitable oxide support material, or a crystalline catalyst, for example a zeolitic catalyst such as ZSM-23 and ZSM-48 and others disclosed in US patents 4906350, often used in conjunction with a Group VIII metal such as Pd or Pt. This process may be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL basestocks and oils, Fischer-Tropsch hydrocarbon derived basestocks and oils, and wax isomerate hydroisomerized basestocks and oils are described in, for example, U.S. Pat. Nos. 2,817,693; 4,542,122; 5,5456,74; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents 324528, 532116, 532118, 537815, 583836, 666894, 668342, 776959; WO patent applications 97/31693, 99/20720, 99/45085, 02/64710, 02/64711, 02/70627, 02/70629, 03/33320; and British Patents 1350257; 1390359; 1429494; and 1440230. Particularly favorable processes are described in European Patent Applications 464546 and 464547. Processes using Fischer-Tropsch wax feeds are described in U.S. Pat. Nos. 4,594,172; 4,943,672; 6,046,940; 6,103,099; 6,332, 974; 6,375,830; and 6,475,960.

As used herein, the following terms have the indicated meanings: "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and may be further hydrotreated to remove heteroatoms.

c) Group III Mineral Oils:

In another embodiment, the NFP comprises a Group III Mineral Oil. Preferably the NFP has a saturates levels of 90% or more (preferably 92% or more, preferably 94% or more, preferably 95% or more, preferably 98% or more); a sulfur content of less than 0.03% (preferably between 0.001 and 0.01%); and a VI of 120 or more (preferably 130 or more, preferably 140 or more). Preferably the Group III Mineral Oil has a kinematic viscosity at 100° C. of 3 to 50, preferably 4 to 40 cSt, preferably 6 to 30 cSt, preferably 8 to 20; and/or a number average molecular weight of 300 to 5,000 g/mol, preferably 400 to 2,000 g/mol, preferably 500 to 1,000 g/mol. Preferably the Group III Mineral Oil has a pour point of −10° C. or less, a flash point of 200° C. or more, and a specific gravity (15.6° C./15.6° C.) of 0.86 or less.

Preferably, the Group III Mineral Oil is a Group III basestock. Desirable Group III basestocks are commercially available from a number of sources and include those described in the table below. The percentage of carbons in chain-type paraffinic structures ($C_P$) in such liquids is greater than 80%.

| Commercially available Group III Basestocks | | | | |
|---|---|---|---|---|
| | KV @ 100° C., cSt | VI | Pour Point, ° C. | Specific gravity | Flash Point, ° C. |
| UCBO 4R[1] | 4.1 | 127 | −18 | 0.826 | 216 |
| UCBO 7R[1] | 7.0 | 135 | −18 | 0.839 | 250 |
| Nexbase 3043[2] | 4.3 | 124 | −18 | 0.831 | 224 |
| Nexbase 3050[2] | 5.1 | 126 | −15 | 0.835 | 240 |

-continued

Commercially available Group III Basestocks

|  | KV @ 100° C., cSt | VI | Pour Point, ° C. | Specific gravity | Flash Point, ° C. |
|---|---|---|---|---|---|
| Nexbase 3060[2] | 6.0 | 128 | −15 | 0.838 | 240 |
| Nexbase 3080[2] | 8.0 | 128 | −15 | 0.843 | 260 |
| Yubase YU-4[3] | 4.2 | 122 | −15 | 0.843 | 230 |
| Yubase YU-6[3] | 6.5 | 131 | −15 | 0.842 | 240 |
| Yubase YU-8[3] | 7.6 | 128 | −12 | 0.850 | 260 |
| Ultra-S 4[4] | 4.3 | 123 | −20 | 0.836 | 220 |
| Ultra-S 6[4] | 5.6 | 128 | −20 | 0.839 | 234 |
| Ultra-S 8[4] | 7.2 | 127 | −15 | 0.847 | 256 |
| VHVI 4[5] | 4.6 | 128 | −21 | 0.826 |  |
| VHVI 8[5] | 8.0 | 127 | −12 | 0.850 | 248 |
| Visom 4[6] | 4.0 |  |  |  | 210 |
| Visom 6[6] | 6.6 | 148 | −18 | 0.836 | 250 |

[1] Available from ChevronTexaco (USA).
[2] Available from Neste Oil (Finland).
[3] Available from SK Corp (South Korea).
[4] Available from ConocoPhillips (USA)/S-Oil (South Korea).
[5] Available from PetroCanada (Canada).
[6] Available from ExxonMobil (USA).

In another embodiment, plasticizers such as those described as non-functionalized plasticizers (NFP's) in WO 04/014998 at pages 9 to 28, particularly pages 16 line, 14 to page 20, line 17) are added to the compositions of this invention. Page 16, line 14 to Page 20, line 15 describes the following NFP's:

The NFP comprises polyalphaolefins comprising oligomers of linear olefins having 6 to 14 carbon atoms, more preferably 8 to 12 carbon atoms, more preferably 10 carbon atoms having a Kinematic viscosity of 10 or more (as measured by ASTM D 445); and preferably having a viscosity index ("VI"), as determined by ASTM D-2270 of 100 or more, preferably 110 or more, more preferably 120 or more, more preferably 130 or more, more preferably 140 or more; and/or having a pour point of −5° C. or less (as determined by ASTM D 97), more preferably −10° C. or less, more preferably −20° C. or less.

In another embodiment polyalphaolefin oligomers useful in the present invention comprise $C_{20}$ to $C_{1500}$ paraffins, preferably $C_{40}$ to $C_{1000}$ paraffins, preferably $C_{50}$ to $C_{750}$ paraffins, preferably $C_{50}$ to $C_{500}$ paraffins. The PAO oligomers are dimers, trimers, tetramers, pentamers, etc. of $C_5$ to $C_{14}$ α-olefins in one embodiment, and $C_6$ to $C_{12}$ α-olefins in another embodiment, and $C_8$ to $C_{12}$ α-olefins in another embodiment. Suitable olefins include 1-pentene, 1-hexene, 1-heptene, 1-octene, 1-nonene, 1-decene, 1-undecene and 1-dodecene. In one embodiment, the olefin is 1-decene, and the NFP is a mixture of dimers, trimers, tetramers and pentamers (and higher) of 1-decene. Preferred PAO's are described more particularly in, for example, U.S. Pat. No. 5,171,908, and U.S. Pat. No. 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999).

PAO's useful in the present invention typically possess a number average molecular weight of from 100 to 21,000 in one embodiment, and from 200 to 10,000 in another embodiment, and from 200 to 7,000 in yet another embodiment, and from 200 to 2,000 in yet another embodiment, and from 200 to 500 in yet another embodiment. Preferred PAO's have viscosities in the range of 0.1 to 150 cSt at 100° C., and from 0.1 to 3000 cSt at 100° C. in another embodiment (ASTM 445). PAO's useful in the present invention typically have pour points of less than 0° C. in one embodiment, less than −10° C. in another embodiment, and less than −20° C. in yet another embodiment, and less than −40° C. in yet another embodiment. Desirable PAO's are commercially available as SHF and SuperSyn PAO's (ExxonMobil Chemical Company, Houston Tex.), some of which are summarized in the Table 2 below.

TABLE 2

SHF and SuperSyn** Series Polyalphaolefins

| PAO | Specific Gravity (15.6/15.6° C.) | Viscosity @ 100° C., cSt | VI | Pour Point, °C. |
|---|---|---|---|---|
| SHF-20 | 0.798 | 1.68 | — | −63 |
| SHF-21 | 0.800 | 1.70 | — | −57 |
| SHF-23 | 0.802 | 1.80 | — | −54 |
| SHF-41 | 0.818 | 4.00 | 123 | −57 |
| SHF-61/63 | 0.826 | 5.80 | 133 | −57 |
| SHF-82/83 | 0.833 | 7.90 | 135 | −54 |
| SHF-101 | 0.835 | 10.0 | 136 | −54 |
| SHF-403 | 0.850 | 40.0 | 152 | −39 |
| SHF-1003 | 0.855 | 107 | 179 | −33 |
| SuperSyn 2150 | 0.850 | 150 | 214 | −42 |
| SuperSyn 2300 | 0.852 | 300 | 235 | −30 |
| SuperSyn 21000 | 0.856 | 1,000 | 305 | −18 |
| SuperSyn 23000 | 0.857 | 3,000 | 388 | −9 |

**SHF grades now sold under SpectraSyn tradename and SuperSyn grades now sold under the name SpectraSyn Ultra Other useful PAO's include those sold under the tradenames Synfluid™ available from ChevronPhillips Chemical Co. in Pasedena Tex., Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

In other embodiments the PAO's have a Kinematic viscosity of 10 cSt or more at 100° C., preferably 30 cSt or more, preferably 50 cSt or more, preferably 80 cSt or more, preferably 110 or more, preferably 150 cSt or more, preferably 200 cSt or more, preferably 500 cSt or more, preferably 750 or more, preferably 1000 cSt or more, preferably 1500 cSt or more, preferably 2000 cSt or more, preferably 2500 or more. In another embodiment the PAO's have a kinematic viscosity at 100° C. of between 10 cSt and 3000 cSt, preferably between 10 cSt and 1000 cSt, preferably between 10 cSt and 40 cSt.

In other embodiments the PAO's have a viscosity index of 120 or more, preferably 130 or more, preferably 140 or more, preferably 150 or more, preferably 170 or more, preferably 190 or more, preferably 200 or more, preferably 250 or more, preferably 300 or more.

In another embodiment, the non-functionalized plasticizer comprises a high purity hydrocarbon fluid composition comprising a mixture of paraffins having 6 to 1500 carbon atoms, preferably 8 to 1000 carbon atoms, preferably 10 to 500 carbon atoms, preferably 12 to 200 carbon atoms, preferably 14 to 150 carbon atoms, preferably 16 to 100 carbon atoms in the molecule. The hydrocarbon fluid composition has an isoparaffin:n-paraffin ratio ranging from 0.5:1 to 9:1, preferably from 1:1 to 4:1. The isoparaffins of the mixture contain greater than fifty percent, 50%, mono-methyl species, e.g., 2-methyl, 3-methyl, 4-methyl, $\geq$5-methyl or the like, with minimum formation of branches with substituent groups of carbon number greater than 1, i.e., ethyl, propyl, butyl or the like, based on the total weight of isoparaffins in the mixture. Preferably, the isoparaffins of the mixture contain greater than 70 percent of the mono-methyl species, based on the total weight of the isoparaffins in the mixture. These hydrocarbon fluids preferably have viscosities KV at 25° C. ranging from 1 to 100,000 cSt, preferably 10 cSt to 2000 cSt and, optionally low pour points typically below −20° C., more preferably below −30° C., more preferably ranging from −20° C. to −70° C. These hydrocarbon fluids preferably have viscosities KV at 40° C. ranging from 1 to 30,000 cSt, preferably 10 cSt to 2000 cSt and, optionally low pour points typically below −20° C., more preferably below −30° C., more preferably ranging from −20° C. to −70° C.

Further, page 23, line 8-14 states: In some embodiments any NFP described herein may have a specific gravity (ASTM D 4052, 15.6/15.6° C.) of less than 0.920 in one embodiment, and less than 0.910 in another embodiment, and from 0.650 to 0.900 in another embodiment, and from 0.700 to 0.860, and from 0.750 to 0.855 in another embodiment, and from 0.790 to 0.850 in another embodiment, and from 0.800 to 0.840 in yet another embodiment, wherein a desirable range may comprise any upper specific gravity limit with any lower specific gravity limit described herein.

In one embodiment of compositions of the present invention, conventional plasticizers such as are commonly used for poly(vinyl chloride) are substantially absent. In particular, plasticizers such as phthalates, adipates, trimellitate esters, polyesters, and other functionalized plasticizers as disclosed in, for example, U.S. Pat. No. 3,318,835; U.S. Pat. No. 4,409,345; WO 02/31044 A1; and PLASTICS ADDITIVES 499-504 (Geoffrey Pritchard, ed., Chapman & Hall 1998) are substantially absent. By "substantially absent", it is meant that these compounds are not added deliberately to the compositions and if present at all, are present at less than 0.5 wt %.

In some embodiments, "naphthenic" mineral oils and "aromatic" mineral oils are substantially absent; i.e., present at less than 0.5 wt % of the inventive composition. In another embodiment, if such oils are present in the composition, the aggregate of such oils is at most 5 wt % of the total liquid modifier in the composition. Also, aromatic moieties and carbon-carbon=saturation are substantially absent from the modifiers used in the present invention in yet another embodiment. Aromatic moieties include a compound whose molecules have the ring structure characteristic of benzene, naphthalene, phenanthrene, anthracene, etc. By "substantially absent", it is meant that these aromatic compounds or moieties are not added deliberately to the compositions, and if present, are present to less than 0.5 wt % of the composition.

Additives

Many additives may be incorporated in the present polymer composition in addition to the cyclic olefin first polymer or copolymer component, the acyclic second copolymer component, and the non-functionalized plasticizer component. Some additives aid in the processing of molded parts; others are added to improve the stability or aesthetics of molded parts. Useful additives include lactones, hydroxylamines, phosphates, clarifying agents, hindered amine anti-oxidants, aromatic amine anti-oxidants, hindered phenol anti-oxidants, divalent sulfur anti-oxidants, trivalent phosphorus anti-oxidants, metal deactivator anti-oxidants, heat stabilizers, low profile additives, UV stabilizers, lubricants, mold release agents, odorants, antistatic agents, antimicrobial agents, slip agents, anti-blocking agents, anti-foaming agents, blowing agents, anti-fogging agents, titanates, flame retardants, dyes, and colorants. Anti-oxidants and titanates are used in some of the compositions of this invention. Preferred anti-oxidant additives are Irganox™ 1010, Capow™ L-12/H, and Irgafos™ 168 combined with FS-042™. Irganox™ 1010, Irgafos™ 168, and FS-042™ are available from Ciba. Capow™ L-12/H is a titanate available from Kenrich.

Processing oils can be added in compounding to improve the moldability of the present composition. Useful processing oils for the compositions of this invention include aliphatic petroleum distillates, aromatic petroleum distillates, alicyclic petroleum distillates, wood byproducts, natural oils, and synthetic oils.

Crosslinking agents can also be added to the present compositions to vulcanize the second copolymer component, to create grafts between the cyclic olefin first polymers or copolymers and the second copolymer, to functionalize either the cyclic olefin polymer or copolymer or the second copolymer, and to cure the composition into a thermoset. Useful crosslinking agents include hydrogen peroxide, alkylhydroperoxides, diacylperoxides, dialkylperoxides, peracids, peresters, sulfur with and without accelerators, zinc with benzothiazole acceleration, phenolic resin curatives, silanes with Pt catalysts or free radical initiators, benzoquinone derivatives, bismaleimides, and metal oxides.

Method of Making the Polymer Composition

The present composition can be prepared by any one of the following methods:

1. Melt blending of a preformed cyclic olefin polymer or copolymer (also referred to as the first polymer or copolymer), a preformed polyolefin modifier (also referred to as the second copolymer or acyclic olefin polymer modifier), the NFP, and any other components in a mixer such as a Braebender Plasticorder, Haake mixer, or Banbury mixer, or in an extruder. A preferred method is a twin screw extruder with a high mixing intensity. (The NFP may be provided as a liquid or may be 1) compounded (preferably with a polyolefin (such as polypropylene (such as e.g. iPP)) or 2) or pre-physically-mixed with one or both of the polymer components, for systems where solid components are preferred over liquid components.)

2. Mixing solutions or suspensions of the modifier and the cyclic olefin polymer or copolymer (with or without the NFP), possibly followed by extrusion or melt mixing to add other components (such as the NFP, if not previously added).

3. Polymerization in a staged reactor, where the polyolefin modifier is made in the first reactor and the cyclic olefin polymer or copolymer is made in a second reactor, possibly followed by extrusion or melt mixing to add other components. The NFP can be added in either or both of the reactors, or may be added later in the melt mixing stage.

4. Polymerization in a staged reactor, where the cyclic olefin polymer or copolymer is made in a first reactor and a polyolefin modifier is made in a second reactor, possibly followed by extrusion or melt mixing to add other components. The NFP can be added in either or both of the reactors, or may be added later in the melt mixing stage.

5. Polymerization of the polyolefin modifier in a solvent containing dissolved cyclic olefin polymer or copolymer (and optional NFP), possibly followed by extrusion or melt mixing to add other components (such as the NFP).

6. Polymerization of the cyclic olefin polymer or copolymer in a solvent containing dissolved polyolefin modifier (and optional NFP), possibly followed by extrusion or melt mixing to add other components (such as the NFP).

7. Polymerization of both the polyolefin modifier and the cyclic olefin polymer or copolymer in the same reactor using two or more catalysts, possibly followed by extrusion or melt mixing to add other components. A chain shuttle agent may or may not be used to make block copolymers in this type of polymerization. The NFP can be added to the reactor, or may be added later in the melt mixing stage.

8. Polymerization where the second double bond of a diene in the polyolefin modifier or the cyclic olefin polymer or copolymer is partially incorporated into other chains of the same type by the polymerization catalyst, leading to long chain branched or gelled polyolefin modifiers or cyclic olefin polymers or copolymers. The NFP can be added to the reactor, or may be added later in the melt mixing stage.

9. Polymerization where the second double bonds of a diene in the polyolefin modifier or cyclic olefin polymer or copolymer is incorporated into chains of other types of polymers by the polymerization catalyst leading to graft copolymers between different polyolefin modifiers, different cyclic olefin polymers or copolymers, or between a polyolefin modifier and cyclic olefin polymer or copolymer. The NFP can be added to the reactor, or may be added later in the melt mixing stage.

10. Crosslinking where an agent is added during mixing to crosslink a second double bond or main chain double bond of either the polyolefin modifiers or the cyclic olefin polymers or copolymers with other double bonds in the composition, typically leading to long chain branched or gelled polyolefin modifiers or cyclic olefin polymers or copolymers and/or grafts between polyolefin modifiers, between cyclic olefin polymers or copolymers, or between polyolefin modifiers and cyclic olefin polymers or copolymers. The NFP can be added before during or after crosslinking, and is typically added later in the melt mixing stage.

11. Functionalization where the main chain double bonds or second double bonds of dienes in either cyclic olefin polymers or copolymers or polymer modifiers or both are functionalized after the cyclic olefin polymers or copolymers and polymer modifiers are already mixed together by one of the preparation methods 1 through 9. The NFP can be added before or after functionalization, and is typically added later in the melt mixing stage.

12. Compositions containing functionalized polyolefin modifiers or cyclic olefin polymers or copolymers made by preparation methods 1, 2, or 11, which are crosslinked as described in preparation methods 8-10, except that reaction occurs between the functional groups instead of a second double bond.

13. Any combination of the techniques described in preparation methods 1-12.

14. Any of the techniques described in preparation methods 1-13 in conjunction with a hydrogenation step in which the main chain or residual (second) double bonds in either the cyclic olefin polymers or copolymers or the polymer modifiers, or both, are partially or completely hydrogenated. The hydrogenation step may occur in a separate reactor, or in the same reactor, as polymerization, mixing, extrusion, dissolution, precipitation, suspension, crosslinking, functionalization, and/or any other preparation steps; and it may utilize the same or different catalysts, including homogeneous and/or heterogeneous catalysts, as other preparation steps.

Polymer Composition

The present three-component polymer compositions comprising cyclic olefin polymers, polyolefin modifiers and non-functionalized plasticizers are advantageous when compared to similar two-component compositions of only cyclic olefin polymers and polyolefin modifiers, or of cyclic olefin polymers and non-functionalized plasticizers. When non-functionalized plasticizers are added to neat cyclic olefin polymers, the Izod impact strength of the resultant cyclic olefin polymer-based blends is decreased. This offers the advantage of independently tuning the $T_g$ of a cyclic olefin polymer to obtain processing or fabrication advantages (e.g., enabling use of a lower injection molding temperature) without simultaneously having to alter the composition or other desirable molecular properties of the cyclic olefin polymer. However, this useful feature is mitigated by increased brittleness, which limits performance and end usage.

In contrast, addition of a non-functionalized plasticizer to a two-component blend of cyclic olefin polymer and polymer modifier results in an enhancement of Izod impact strength for the blend. Thus, the superior low-temperature impact toughness of these three-component blends is an unexpected feature as compared to the properties of compositionally analogous two-component blends that comprise only cyclic olefin polymer and non-functionalized plasticizer. The capability to independently tune and lower the blend component $T_g$s (bestowing processing and low-temperature performance advantages) is retained, while simultaneously providing the added advantage of further reducing brittleness and enhancing low-temperature properties.

Some preferred embodiments herein (e.g. those comprising cyclic olefin copolymers having at least 20 mole % cyclic monomer and a $T_g$ of greater than 150° C., and for high temperature uses) have many outstanding properties, including a room temperature (23° C.) notched Izod impact resistance at 23° C. greater than 500 J/m, such as greater than 550 J/m, for example greater than 600 J/m, even greater than 700 J/m. In these tests no breaks are observed. The composition also has no breaks in notched Izod impact tests at −18° C. and exhibits an impact resistance at this temperature of greater than 50 J/m, such as greater than 150 J/m, for example greater than 300 J/m, even greater than 500 J/m.

Some preferred embodiments herein (e.g. those comprising cyclic olefin copolymers having at least 20 mole % cyclic monomer and a $T_g$ of greater than 150° C., and for high temperature uses) showed only ductile failures at room temperature (23° C.) and at −29° C. in instrumented impact tests and in particular exhibit instrumented impact energy measured at 23° C. of greater than 25 J, even greater than 30 J and instrumented impact energy measured at −29° C. of greater than 25 J, even greater than 30 J. These impact properties are comparable to polycarbonates, ABS, poly(methylmethacrylate), and the best high impact polypropylene blends.

However, the heat distortion temperature of certain preferred embodiments of the compositions (those comprising cyclic olefin copolymers having at least 20 mole % cyclic monomer and a $T_g$ of greater than 150° C., and for high temperature uses), using both 0.45 and 1.80 MPa loads, is much higher than can be achieved with toughened polypropylene blends. In particular, the present polymer composition exhibits a heat distortion temperature measured using a 0.46 MPa load of greater than 150° C., typically greater than 165° C., and a heat distortion temperature measured using a 1.80 MPa load of greater than 115° C., typically greater than 130° C., even greater than 145° C.

Moreover, the flexural modulus (1% secant method) of certain preferred embodiments of the compositions (those comprising cyclic olefin copolymers having at least 20 mole % cyclic monomer and a $T_g$ of greater than 150° C.), is greater than 1200 MPa, such as greater than 1600 MPa, for example greater than 2000 MPa, even greater than 2500 MPa, which is significantly higher than that of current high impact polypropylene thermoplastic polyolefins (TPOs). These properties are much better than any others reported in the literature for blends of polyolefin modifiers and cyclic olefin copolymers.

In another embodiment, the blends of this invention have a room temperature flexural modulus (1% secant, as determined below in the examples section) of at least 1035 MPa and a −18° C. Izod Impact (forward notch, as determined below in the examples section) of at least 40 J/m. Preferably the blends of this invention have a room temperature flexural modulus of at least 1448 MPa, preferably 1655 MPa. Preferably the blends of this invention have a −18° C. Izod Impact (forward notch) of at least 45 J/m, preferably at least 50 J/m.

Production of Articles

Articles can be formed using the present composition by injection molding, compression molding, transfer molding, reaction injection molding, thermoforming, pressing, rotational molding, blow molding, extrusion, extrusion covering, co-extrusion with other polymers, pultrusion alone or with other polymeric materials, lamination with other polymers, coating, fiber spinning, film blowing, film casting, calendaring, or casting. Articles can also be made by any of these methods, where double bonds remaining in the polyolefin modifier or cyclic olefin polymer or copolymer or their functional groups are crosslinked after the articles are formed either thermally or with one of the crosslinking agents.

The polymer compositions described herein are specifically useful for the fabrication of parts of an automobile including:

1. Chassis, mechanics and under the hood applications including gas tanks; bumpers beams; bumper energy absorbers; bumper fascias; grille opening reinforcements; grille opening panels; front end fascia and grilles; front end modules; front end carriers; bolsters; valve covers; rocker arm covers; cylinder head covers; engine covers; engine splash shields; engine timing belt covers; engine air cleaners; engine oil pans; battery cases and trays; fluid reservoirs; cooling system components including cooling fans and shrouds and supports and radiator supports and end tanks; air intake system components; air ducting; wheel covers; hub caps; wheel rims; suspension and transmission components; and switches and sockets.

2. Interior applications including parts of instrument panels (IP) including IP carriers and retainers, IP basic structures, IP uppers, IP lowers, and IP instrument clusters; air bag housings; interior pedals; interior consoles including center and overhead consoles and console trim; steering column housings; seat structures including seat backs and pans; interior trim including pillar trim, IP trim, and door trim panels; liftgate and hatch inner panels; door and window handles; HVAC housing; load floors; trunk liners; storage systems; package trays; door cores and door core modules.

3. Body applications including underbody panels and streamlining; rocker panels; running boards; pickup boxes; vertical body panels including fenders, quarter panels, liftgate and hatch outer panels, and door outer panels; horizontal body panels including hoods, trunks, deck lids, and roofs and roof modules; spoilers; cowl vent leaf catchers, grilles, and screens; spare wheel wells; fender liners; exterior trim; exterior door handles; signal lamp housings; head and rear lamp housings; and mirror housings.

The polymer compositions described herein can also be used to fabricate parts similar to those listed for automobiles but for heavy trucks and mass transit vehicles, such as buses, trains, and airplanes, as well as for recreational vehicles such as snowmobiles, all-terrain vehicles, sailboats, powerboats, and jet skis. Other uses for the polymer compositions described herein include the fabrication of (a) recreational goods such as toys, helmets, bicycle wheels, pool equipment housings, and rackets; (b) parts for large consumer appliances, such as washing machine tubs, refrigerator interior liners, and appliance exterior housings; (c) housings for business machines, hand tools, laboratory instruments, electronic equipment, small machinery and appliances; (d) parts for furniture; (e) structural elements in residential and commercial building and construction such as exterior panels and curtain walls, window and door frames, fascia and soffits, shutters, and HVAC components; (I) medical devices, cookware and storage ware, sterilizable devices and sterilization containers, decorative and household articles; and (g) fabricated large waste management containers.

This invention further relates to:

1. A polymer composition comprising a blend comprising:
    (a) greater than 30 wt % (based upon the weight of the composition) of a cyclic olefin polymer having a $T_g$ greater than 60° C. and having a Tm heat of fusion of 40 J/g or less selected from the group consisting of:
        i) copolymers comprising at least one acyclic olefin and at least 15 mole % of one or more cyclic olefins;
        ii) partially or completely hydrogenated copolymers comprising at least one acyclic olefin and at least 15 mole % of one or more cyclic olefins;
        iii) metathesis copolymers comprising two or more cyclic olefins;
        iv) partially or completely hydrogenated metathesis copolymers comprising two or more cyclic olefins;
        v) metathesis homopolymers comprising cyclic olefins;
        vi) partially or completely hydrogenated metathesis homopolymers comprising cyclic olefins; and
        vii) mixtures thereof;
    (b) from 1 to 50 wt (based upon the weight of the composition) of an acyclic olefin polymer modifier having a glass transition temperature of less than 0° C.;
    (c) from 0.1 to 50 wt (based upon the weight of the composition) of a non-functionalized plasticizer having a kinematic viscosity at 100° C. of 3 to 3000 cSt, a viscosity index of 120 or more, a pour point of 0° C. or less and a flash point of 200° C. or more.

2. The composition of paragraph 1 wherein the cyclic olefin polymer is selected from the group consisting of: ethylene-norbornene copolymers; ethylene-dicyclopentadiene copolymers; ethylene-norbornene-dicyclopentadiene terpolymers; ethylene-2,3,3a,4,7,7a-hexahydro-4,7-methano-1H-indene copolymers; ethylene-tricyclodecene copolymers; ethylene-norbornene-2,3,3a,4,7,7a-hexahydro-4,7-methano-1H-indene terpolymers; ethylene-dicyclopentadiene-2,3,3a,4,7,7a-hexahydro-4,7-methano-1H-indene terpolymers; ethylene-norbornene-tricyclodecene terpolymers; ethylene-norbornene-tetracyclododecene terpolymers; ethylene-norbornene-ethylidene norbornene terpolymers; ethylene-norbornene-vinylnorbornene terpolymers; ethylene-norbornene-1,7-octadiene terpolymers; ethylene-cyclopentene copolymers; ethylene-indene copolymers; ethylene-tetracyclododecene copolymers; ethylene-norbornene-vinylcyclohexene terpolymers; ethylene-norbornene-7-methyl-1,6-octadiene terpolymers; propylene-norbornene copolymers; ethylene-propylene-norbornene terpolymers; propylene-dicyclopentadiene copolymers; ethylene-propylene-dicyclopentadiene terpolymers; propylene-2,3,3a,4,7,7a-hexahydro-4,7-methano-1H-indene copolymers; ethylene-propylene-2,3,3a,4,7,7a-hexahydro-4,7-methano-1H-indene terpolymers; propylene-norbornene-2,3,3a,4,7,7a-hexahydro-4,7-methano-1H-indene terpolymers; propylene-tricyclodecene copolymers; ethylene-propylene-tricyclodecene terpolymers; propylene-tetracyclododecene copolymers; ethylene-propylene-tetracyclododecene terpolymers; ethylene-norbornene-tetracyclododecene terpolymers; ethylene-norbornene-styrene terpolymers; ethylene-norbornene-p-methylstyrene terpolymers; hydrogenated ethylene-dicyclopentadiene copolymers; hydrogenated ethylene-dicyclopentadiene-2,3,3a,4,7,7a-hexahydro-4,7-methano-1H-indene terpolymers; hydrogenated propylene-dicyclopentadiene copolymers; hydrogenated ethylene-propylene-dicyclopentadiene terpolymers; hydrogenated ethylene-norbornene-dicyclopentadiene terpolymers; epoxidized ethylene-dicyclopentadiene copolymers; epoxidized ethylene-propylene-dicyclopentadiene terpolymers; epoxidized ethylene-norbornene-dicyclopentadiene terpolymers; metathesis homopolymers and copolymers of dicyclopentadiene, 2,3,3a,4,7,7a-hexahydro-4,7-methano-1H-indene, tricyclodecene, tetracyclododecene, substituted derivatives of these monomers, and higher Diels-Alder derivatives of norbornene and these monomers; and partially or completely hydrogenated metathesis homopolymers and copolymers of dicyclopentadiene, 2,3,3a,4,7,7a-hexahydro-4,7-methano-1H-indene, tricyclodecene, tetracyclododecene, substituted derivatives of these monomers, and higher Diels-Alder derivatives of norbornene and these monomers.

3. The composition of paragraph 1 wherein the cyclic olefin polymer is selected from the group consisting of: copolymers comprising ethylene and norbornene, copolymers comprising ethylene and octahydrodimethanonaphthalene, copolymers comprising ethylene and a substituted derivative of octahydrodimethanonaphthalene, terpolymers comprising ethylene, octahydrodimethanonaphthalene, and a substituted derivative of octahydrodimethanonaphthalene, copolymers comprising ethylene and 2,3,3a,4,7,7a-hexahydro-4,7-methano-1H-indene, copolymers comprising ethylene, norbornene, and 2,3,3a,4,7,7a-hexahydro-4,7-methano-1H-indene; copolymers comprising ethylene and dicyclopentadiene or a hydrogenated derivative of such a copolymer; copolymers comprising ethylene, norbornene, and dicyclopentadiene or a hydrogenated derivative of such a copolymer; or hydrogenated metathesis homopolymers or copolymers of dicyclopentadiene or tetracyclododecene.

4. The composition of paragraph 1, 2 or 3 wherein the acyclic olefin polymer comprises a polymer selected from the group consisting of:
(A) elastomeric flexible cycloolefinic random copolymers comprising an ethylene component, a cycloolefin component and an α-olefin component having 3 to 20 carbon atoms;
(B) amorphous or low-crystalline flexible olefinic copolymers comprising at least two components selected from the group consisting of an ethylene component, a propylene component, and α-olefin components having from 4 to 20 carbon atoms,
(C) elastomeric olefin/nonconjugated diene copolymers comprising a nonconjugated diene component and at least two components selected from the group consisting of an ethylene component, a propylene component and α-olefin components having 4 to 20 carbon atoms,
(D) elastomeric diene/aromatic vinyl copolymers selected from the group consisting of random copolymers and block copolymers, each of said copolymers comprising a conjugated diene component and an aromatic vinyl hydrocarbon component, and the hydrogenation products of said diene/aromatic vinyl copolymers; and
(E) elastomeric homopolymers selected from the group consisting of substantially atactic polypropylene, polybutadiene and polyisoprene, and the hydrogenated products of polybutadiene and polyisoprene.

5. The composition of paragraph 1, 2 or 3 wherein the acyclic olefin polymer comprises a polymer selected from the group consisting of: propylene homopolymer rubbers; ethylene-propylene copolymer rubbers; ethylene-α-olefin copolymer rubbers or propylene-α-olefin copolymer rubbers, wherein the α-olefin in said copolymer rubbers is selected from 1-butene, 1-pentene, 1-hexene, 4-methyl-1-pentene, 1-octene and 1-decene; elastomeric cycloolefinic random copolymers comprising an ethylene component, a cycloolefin component selected from:
bicyclo[2,2,1]hept-2-ene;
5,10-dimethyltetracyclo[4,4,0,1$^{2.5}$,1$^{7.10}$]-3-dodecene;
hexacyclo[6,6,1,1$^{3.6}$,1$^{10.13}$,0$^{2.7}$,0$^{9.14}$]-4-heptadecene;
pentacyclo[6,5,1,1$^{3.6}$,0$^{2.7}$,0$^{9.13}$]-4-pentadecene;
pentacyclo[6,5,1,1$^{3.6}$,0$^{2.7}$,0$^{9.13}$]-4-hexadecene;
tricyclo[4,3,0,1$^{2.5}$]-3-decene;
substituted derivatives of said cycloolefins; and
an α-olefin component selected from propylene, 1-butene, 1-pentene, 1-hexene, 4-methyl-1-pentene, 1-octene, 1-dodecene, 1-tetradecene, 1-hexadecene, 1-octadecene, 1-eicosene and mixtures thereof; styrene-butadiene block copolymer rubbers; styrene-butadiene-styrene block copolymer rubbers; styrene-isoprene block copolymer rubbers; styrene-isoprene-styrene block copolymer rubbers; hydrogenated styrene-butadiene-styrene block copolymer rubbers; hydrogenated styrene-isoprene-styrene block copolymer rubbers; graft-modified derivatives of styrene-butadiene block copolymer rubbers, styrene-butadiene-styrene block copolymer rubbers, styrene-isoprene block copolymer rubbers, styrene-isoprene-styrene block copolymer rubbers, hydrogenated styrene-butadiene-styrene block copolymer rubbers, hydrogenated styrene-isoprene-styrene block copolymer rubbers; polybutadiene; polyisoprene; hydrogenated polybutadiene; hydrogenated polyisoprene.

6. The composition of paragraph 1, 2 or 3 wherein the acyclic olefin polymer comprises a polymer selected from the group consisting of: ethylene-propylene-diene copolymer rubbers, an ethylene-α-olefin-diene copolymer rubber or a propylene-α-olefin-diene copolymer rubbers wherein the α-olefin in said copolymer rubbers is selected from 1-butene, 1-pentene, 1-hexene, 4-methyl-1-pentene, 1-octene and 1-decene, and wherein the diene in said copolymer rubbers is selected from 1,4-hexadiene, 1,6-octadiene, 2-methyl-1,5-hexadiene, 6-methyl-1,5-heptadiene, 7-methyl-1,6-octadiene, 1,4-cyclohexadiene, dicyclopentadiene, 4-vinyl-1-cyclohexene, methyltetrahydroindenes, 5-vinyl-2-norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

7. The composition of any of paragraphs 1 to 6, wherein the acyclic olefin polymer is graft copolymerized or functionalized with an unsaturated carboxylic acid-based graft comonomer selected from acrylic acid, maleic acid, fumaric acid, tetrahydrophthalic acid, itaconic acid, citraconic acid, crotonic acid, isocrotonic acid, nadic Acid™ (endo-cis-bicyclo[2,2,1]hept-5-ene-2,3-dicarboxylic acid), and their acid halide, amide, imide, anhydride, and ester derivatives.

8. The composition of any of paragraphs 1 to 8 wherein the non-functionalized plasticizer has a kinematic viscosity at 100° C. of 10 cSt or more and/or a viscosity index of 150 or more, and/or a pour point of −20° C. or less and/or a flash point of 230° C. or more, and/or a specific gravity of 0.86 or less.

9. The composition of any of paragraphs 1 to 8 wherein the non-functionalized plasticizer is a polyalphaolefin having an $M_n$ of 300 to 21,000 g/mol, wherein the polyalphaolefin comprises oligomers of one or more alpha-olefins selected from the group consisting of 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof, preferably the polyalphaolefin is an oligomer of decene-1.

10. The composition of any of paragraphs 1-8 wherein the non-functionalized plasticizer is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures.

11. The composition of any of paragraphs 1 to 10 wherein the blend has a room temperature 1% secant flexural modulus of at least 1655 MPa and/or a −18° C. Izod Impact (forward notch) of at least 50 J/m.

12. The composition of any of paragraphs 1 to 11 wherein the cyclic olefin polymer has a light transmittance of 89 or more.

13. An article of manufacture comprising the composition of any of paragraphs 1 to 12.

14. A polymer composition comprising:
  a) greater than 50 wt (based upon the weight of the composition) of a cyclic olefin copolymer, said cyclic olefin copolymer comprising at least one acyclic olefin and at least 20 weight % of one or more cyclic olefins (based upon the weight of the cyclic olefin copolymer), wherein at least a portion of said cyclic olefin copolymer has a glass transition temperature of greater than 150° C.;
  b) less than 50 wt % (based upon the weight of the composition) of an acyclic olefin polymer modifier, at least a portion of the modifier having a glass transition temperature of less than −30° C.; and no portion of the modifier having a softening point greater than +30° C., the Bicerano solubility parameter of the modifier being no more than 0.6 $J^{0.5}/cm^{1.5}$ less than the Bicerano solubility parameter of the cyclic olefin copolymer;
  c) a non-functionalized plasticizer, having a kinematic viscosity at 100° C. of 10 cSt or more, a viscosity index of 120 or more, and a pour point of 0° C. or less;
  d) wherein the notched Izod impact resistance of the composition measured at 23° C. is greater than 500 μm and the heat distortion temperature of the composition measured using a 0.46 MPa load is greater than 135° C.

15. The polymer composition of paragraph 14 wherein said cyclic olefin copolymer comprises at least 30 weight % of one or more cyclic olefins, and the polymer modifier comprises a copolymer of ethylene, a higher alpha-olefin, and at least 5 wt % but less than 20 wt % of a cyclic olefin, and the modifier has a glass transition temperature of less than −30° C.

In the foregoing description and the claims, the following test methods are employed to measure the various parameters identified. Additional details for the test methods used in the Examples to measure the properties listed in Tables 1-3 are specified in the relevant Examples themselves, specifically Comparative Examples C1 and C4, and the Table footnotes.

Mole percent of cyclic and acyclic monomers in the polymeric components of the blends were measured by standard characterization techniques, such as solution $^{1}H$ and/or $^{13}C$ nuclear magnetic resonance (NMR) spectroscopy at concentrations and temperatures of sufficient polymer solubility, utilizing integration of characteristic resonances for the various types of enchained comonomer units. $^{1}H$ NMR is typically used to characterize hydrogenated polymers via the integration of (or complete absence of) olefinic resonances for the polymer's main chain or residual double bonds compared to the integral representing saturated units and other comonomer units. For purposes of this invention, a one to one numerical average of mole % comonomer values obtained by $^{13}C$ NMR and $^{1}H$ NMR shall be used to calculate mole percents. In cases of disagreement between these techniques (greater than 5.0 mole % variability for any comonomer units quantified), the technique with the best resolution of the characteristic, chemically distinct resonances integrated to quantify mole % shall be used.

Glass transition temperature ($T_g$), melting temperature ($T_m$), and $T_m$ heat of fusion ($\Delta H_f$) for cyclic olefin polymer and polymer modifier components of the invention were measured by differential scanning calorimetry (DSC) using a scan rate of 10° C. per minute. After conducting a first heat and first cool cycle that span the temperature range of the expected transitions, the $T_g$ and $T_m$ (if any) midpoints (and onset, if desired) and the heat of fusion (if any) are calculated from the second heat cycle. Areas under the DSC curve are used to determine the heat of fusion upon melting ($T_m$) (also referred to as $H_f$, $\Delta H_f$, and $T_m$ heat of fusion).

Kinematic viscosity, viscosity index, pour point, specific gravity, flash point, and molecular weight ($M_n$) for non-functionalized plasticizers are measured as described above. Number average molecular weight ($M_n$) of the NFP is determined by GC or GPC as described in PCT/US07/15486. Unless otherwise noted below physical properties of the NFP's and polyolefin components are determined by the methods listed or described in PCT/US07/15486 which is incorporated by reference herein.

Heat distortion temperatures (HDT) were measured using ASTM methods D648-06 and D1525-00. Before testing, the samples were conditioned for at least 40 hours @ 23° C.±2° C. and 50%±5% humidity. ASTM test bars were 0.125" thick×5" wide×5" length.

Flexural modulus data at 1% secant are collected according to ASTM method D-790 (or D790-03). At least five specimens per sample are tested. Before testing, the samples are optionally conditioned for 40 hours at 23° C.±2° C. and 50%±5% relative humidity in bags. Tests noted only as "room temperature" (as opposed to 23° C.) were performed under ambient conditions with no preconditioning and are noted as such; room temperature was typically found to be ~20° C. (In event of any conflict between D-790 and D790-03, D790 shall be used).

Room temperature (ambient, i.e. ~20° C., or when specified, 23° C.) and low temperature (−18° C.) notched Izod were measured according to ASTM method D256 (E) (or D256-06). Test specimens tested via D256-06 at 23° C. were 2.5 inches long, 0.5 inches wide, and 0.125 inches thick. At least five specimens were cut using a clipper belt cutter from the uniform center of Type 1 tensile bars. Samples were notched using a TMI Notching cutter. Samples were conditioned at 23±2° C. and 50±5% relative humidity for a minimum of 40 hours after cutting and notching. For sub-ambient testing, notched test specimens were conditioned at the specified test temperature for a minimum of one hour before testing. The types of break observed in the notched Izod impact tests are coded and classified as follows:
  C means complete break,
  NB means no break,
  P is a partial break where the top stays above the line of the break, and
  H is a hinged partial break where the top portion hangs below the line of the break.

Test specimens tested by D256 Method E at ambient room temperature (~20° C.) or −18° C. were molded directly into test bars of the proper dimension (63 mm×12 mm×3 mm) and were not preconditioned for tests only noted as "room temperature". At least five specimens per sample were tested. (In event of any conflict between D256 (E) or D256-06, D256 (E) shall be used).

Instrumented impact at room temperature (23° C.) and low temperature (−18° C. or −9° C.) was measured according to ASTM method D3763-O2. Standard test specimens are 4.0 in. diameter disks. A minimum of five specimens were tested for each sample at each temperature. Before testing, samples were conditioned at 23±2° C. and 50±5% relative humidity for a minimum of 40 hours. If low temperature testing was performed, the specimens to be tested were conditioned for 4 hours prior to testing. The types of breaks observed in the instrumented impact tests are coded and classified as follows:

B means a brittle failure,
BD means a brittle failure showing some ductile flow,
DB is a ductile failure where the polymer has deformed out of the way of the projectile but has cracked,
D is a failure where the polymer deformed out of the way of the projectile without any cracking.

Melt flow rates at 230° C. (2.16 kg), were measured according to ASTM method D1238-04c (or D1238 Procedure B). (In event of any conflict between D1238-04c and D1238 procedure B, D1238 procedure B shall be used).

Bicerano solubility parameters were determined by the Van Krevelen method described in chapter 5 of Jozef Bicerano's *Prediction of Polymer Properties*, $3^{rd}$ Edition, Marcel Dekker, Inc., 2002. A programmed version of this estimation method was used in the example tables. It is available in the Polymer Module of the molecular modeling software package, Cerius$^2$, version 4.0, available from Accelrys, Inc.

Softening points (Vicat) of acyclic olefin polymer modifiers are determined by ASTM D 1525 (10N, 50° C./hr).

EXAMPLES

The invention will now be more particularly described with reference to the following non-limiting Examples.

Figure 2:
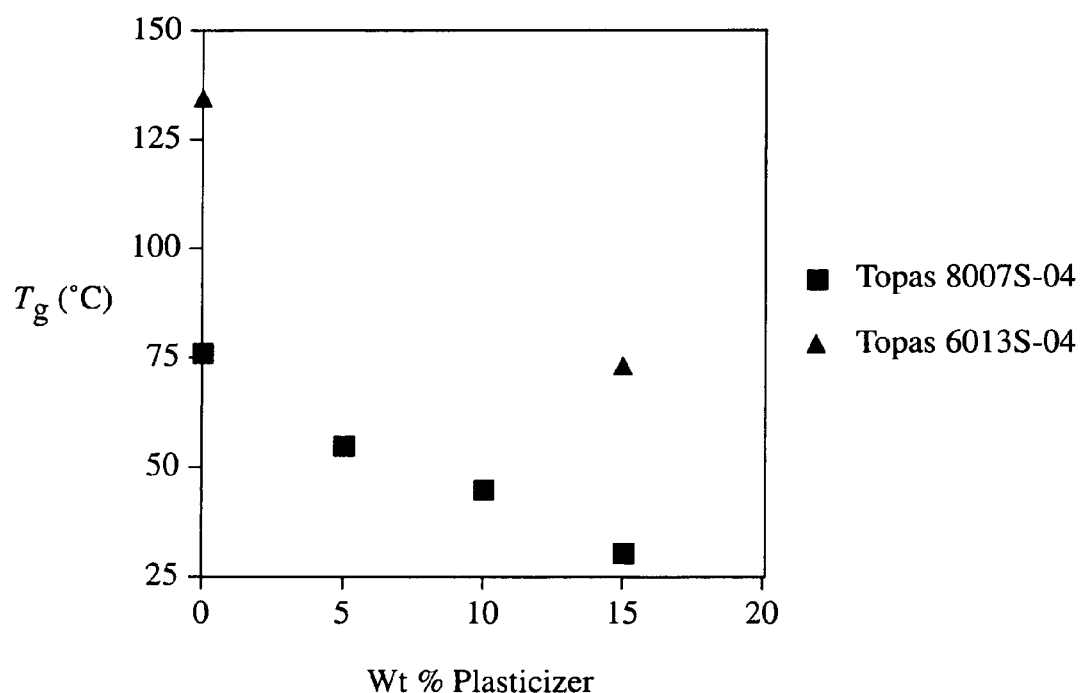
FIG. 2 is a graph showing the effect of non-functionalized plasticizer on the glass transition temperature of neat cyclic olefin copolymers (Comparative Examples C1-C5).
Figure 3:
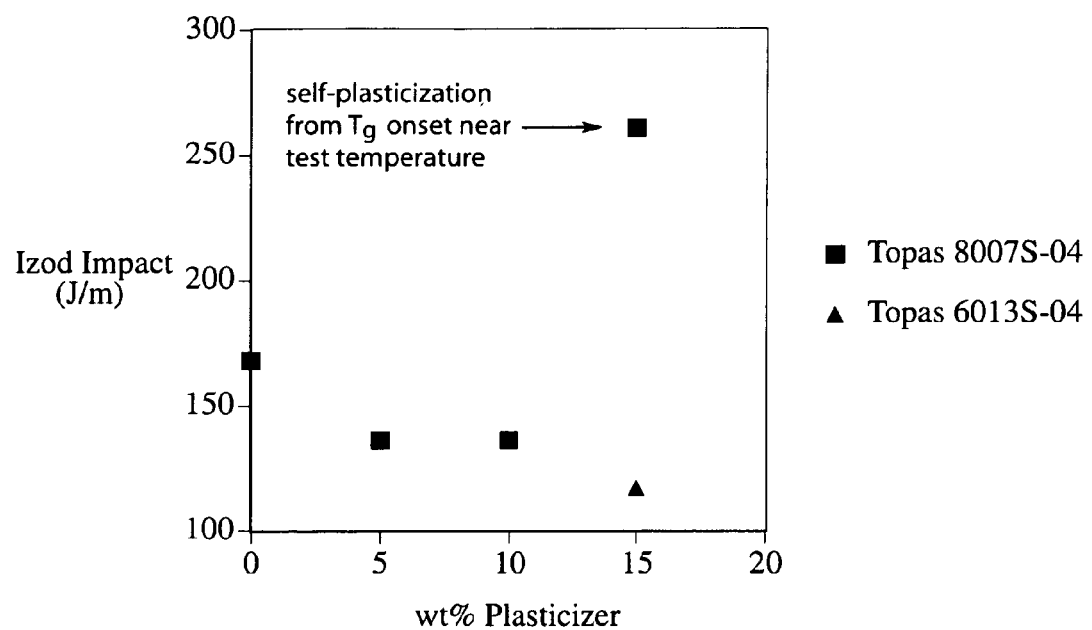
FIG. 3 is a graph showing the detrimental effect of non-functionalized plasticizer on the room temperature Izod impact strength of a neat cyclic olefin copolymer (Comparative Examples C1-C5).

Table 1 presents the properties of the materials used in the Examples and Comparative Examples.

plasticizer to neat cyclic olefin copolymer. The base $T_g$ of the cyclic olefin copolymer (76.6° C.) is increasingly depressed towards that of the non-functionalized plasticizer (−85.0° C.) as predicted by the Fox equation for two-component blends. The $T_g$ of the cyclic olefin copolymer is also increasingly broadened, as evidenced by a greater temperature difference between onset and midpoint. Both flexural modulus and room temperature Izod impact are also decreased upon addition of plasticizer, until the $T_g$ is lowered so significantly (Comparative Example C3) that room temperature test data are affected. The increased brittleness of the "plasticized" cyclic olefin copolymers is also evidenced by complete break of the bars during flexural modulus testing; associated stress-strain curves showing lessened yield; and the appearance of internal defects in the test bars after flexural deformation. Data for Comparative Examples C1-C5 is summarized and shown in Table 2 and FIGS. 2 and 3. FIG. 2 is a graph showing the effect of non-functionalized plasticizer on the glass transition temperature of neat cyclic olefin copolymers. FIG. 3 is a graph showing the detrimental effect of non-functionalized plasticizer on the room temperature Izod impact strength of a neat cyclic olefin copolymer.

A 500 g portion of Topas™ 8007S-04 resin (Topas™ Advanced Polymers GmbH, see Table 1) was ground to a 2 mm mesh size using a Thomas-Wiley Model 4 Laboratory Mill and mixed on a rolling mixer overnight with 0.5 g Irganox B215-FF stabilizer. Subsequently, a 42.75 g portion of the stabilized resin was dry-mixed with 2.25 g of SpectraSyn 10 PAO (ExxonMobil Chemical Co., See Table 1). This mixture was added over a period of 3:10 min (3 minutes 10 seconds) to a Thermo Electron Corp. Haake PolyLab System mixer equipped with a Haake Reomix 600 mixing head, operating at 30 rpm, and a 50 g capacity bowl which had been

TABLE 1

Properties of Cyclic Olefin Copolymers, Polymer Modifier, and Non-Functionalized Plasticizer Used in Example 1 and Comparative Examples C1-C6.

| Polymer or PAO | Composition (mol %)$^a$ | $T_g$ Midpt (° C.) (onset)$^b$ | $T_m$ (° C.); $\Delta H_f$ (J/g)$^b$ | $T_m{}^b$ (° C.) | $M_w$; $M_n{}^c$ (g/mol) | Kinematic viscosity (100° C., cSt)$^d$ |
|---|---|---|---|---|---|---|
| Topas ™ 8007S-04 | 36.7 NB 63.3 E | 76.2 (73.6) | None (0) | none | 47,350; 28,810 | — |
| Topas ™ 6013S-04 | 54.0 NB 46.0 E | 134.9 (131.4) | None (0) | none | 38,420; 22,120 | — |
| Vistalon ™ 7001 | 1.1 ENB 15.4 P 83.5 E | −41.8 (−47.6) | 40.9 (v.br.) (26.1) | 40.9 (v.br.) | 169,800; 83,870$^e$ | — |
| SpectraSyn ™ 10$^f$ | — | −85.0 (−85.8) | −57.3 ($^f$) | −57.3 | — | 10.0 |

$^a$E = ethylene; NB = norbornene; P = propylene; ENB = 5-ethylidene-2-norbornene; average of $^1$H and $^{13}$C Nuclear Magnetic Resonance (NMR) measurements.
$^b$DSC, $2^{nd}$ heat, midpoint ($T_g$) or maximum ($T_m$) using the test method described in Comparative Example 1; v.br. = very broad.
$^c$Gel Permeation Chromatography in 1,2,4-trichlorobenzene; Waters Associates 2000 GPC with three Polymer Laboratories mixed bed high-porosity Type LS B columns (10 μm particle size, 7.8 mm inner diameter, 300 mm length) and an internal waters Differential Refractive Index detector at 135° C.; typical sample concentration 2 mg/mL; polyethylene standards.
$^d$Reported by manufacturer.
$^e$By light scattering analysis using conditions and instrumentation similar to that described in (c) with polyethylene parameters and a Wyatt MiniDawn EOS 3-angle light scattering detector.
$^f$SpectraSyn ™ 10 has a specific gravity of 0.835, a viscosity index of 137, a pour point of −48° C., and a flash point of 266° C.; $\Delta H_f$ was not calculable due to interference from $T_g$ hysteresis in DSC spectrum.

Comparative Example C1

Preparation of Cyclic Olefin Copolymer/Non-Functionalized Plasticizer Blend Containing 5 wt % Plasticizer This Comparative Example and Comparative Examples C2-C4 illustrate the effects of adding non-functionalized preheated to 160° C. The rotor speed was increased to 60 rpm for a 1 minute period. The rotor speed was then lowered back to 30 rpm and the material was mixed for an additional 5 minutes. After halting the stirrer, the blend was removed from the mixer bowl and cut into small pieces with a scissors while warm. The blend was then re-ground to a 2 mm mesh size and subjected to Differential Scanning calorimetry (DSC) analysis using a TA Instruments model 2920 calorimeter with a scan rate of 10° C./minute from ≦−100 to ≧160° C. The ground blend was injection-molded into rectangular test bars of dimension 63×12×3 mm using a DSM Research B.V. Model 2002-16-16 Injection Molding machine equipped with a DSM 5 cc Micro Extruder. The parameters used were: 100 rpm mixing, 2 minute mixing time, mixer barrel temperature 200° C.; transfer tool temperature 190° C.; mold temperature 25° C. The resultant bars were transparent with a slight brown tint. Five bars were subjected to room temperature 1% Secant Flexural Modulus testing following ASTM D 790 using an Instron tester (Series IX software, 5500 Series Interface, System 8.02.00, 224.8 lb load cell, 10.000 pts/sec sample rate, 0.0500 in/min crosshead speed). Room temperature was approximately 20° C. An additional five bars were subjected to a reverse notch room temperature (ca. 20° C.) Izod Impact testing protocol based on ASTM D 256 (Method E) using a Tinius Olsen Model 66 Plastic Impact Tester with a manual readout scale. An 0-25 inch-lb capacity scale was used without additional weight on the hammer. All bars exhibited complete break (C) upon impact. Impact data was converted from in-lb to ft-lb and then into units of ft-lb/in by dividing by the thickness of the bars (all 0.12 in (0.3 cm) as measured during modulus testing), and then into units of J/m (1 ft-lb/in =53.4 J/m). Results are given in Table 2.

PAO. The resin/PAO mix was added to the mixer over a 3:30 min period. The resultant blend was injection molded and analyzed similarly to the material in Comparative Example C1 to give similarly appearing test bars. Results are given in Table 2.

A similar Haake procedure, in which the resin and PAO were not pre-mixed, but in which the PAO was added to the mixer at 30-40 rpm and mixed for 5 minutes after the resin had been previously added and agitated at 60 rpm for 1 minute, gave an oily material showing signs of inadequate blending ($T_g$ 73.7° C.).

Comparative Example C3

Preparation of Cyclic Olefin Copolymer/Non-Functionalized Plasticizer Blend Containing 15 wt % Plasticizer A Haake mixing procedure similar to Comparative Example C1 was carried out using 38.25 g of stabilized, powdered Topas™ 8007S-04 resin and 6.75 g SpectraSyn™ 10 PAO. The resin/PAO mix was added to the mixer over a 4:00 min period. The resultant blend was injection molded and analyzed similarly to the material in Comparative

TABLE 2

Properties of the Cyclic Olefin Copolymer/Non-Functionalized Plasticizer Blends of Comparative Examples C1-C5.

| Ex. | Resin | Wt % SpectraSyn™ 10 | $T_g$ Midpt (° C.) (onset)[a] | RT Flex. mod.[b] (Kpsi) | Flex. mod. notes[c] | RT Izod impact (RN)[b,d] (J/m) | RT Izod impact (FN)[d,e] (J/m) | MFR[f] (g/10 min) |
|---|---|---|---|---|---|---|---|---|
| (C4) | Topas™ 8007S-04 (as received) | 0 | 76.2 (73.6) | 413.1 ± 2.5 | No break, yield, No cracks | 164.1 ± 43.6 | 18.5 | 8.712 |
| C4 | Topas™ 8007S-04 ("mixed") | 0 | 76.6 (73.2) | 410.8 ± 3.4 | No break, yield, No cracks | 168.7 ± 26.0 | 13.9 | |
| C1 | Topas™ 8007S-04 | 5 | 55.5 (50.6) | 397.4 ± 3.2 | Break, no yield, Some cracks | 136.3 ± 12.1 | 18.5 | —[h] |
| C2 | Topas™ 8007S-04 | 10 | 45.2 (40.0) | 342.1 ± 2.9 | Break, no yield,[g] Cracks | 136.3 ± 7.4 | 18.5 | —[h] |
| C3 | Topas™ 8007S-04 | 15 | 31.1 (21.1) | 108.3 ± 9.7 | No break, yield, No cracks | 261.4 ± 66.8[i] | 27.8 | —[h] |
| (C5) | Topas™ 6013S-04 (as received) | 0 | 134.9 (131.4) | —[h] | —[h] | —[h] | —[h] | —[h] |
| C5 | Topas™ 6013S-04 | 15 | 73.6 (65.3) | 409.3 ± 2.4 | Break, —[h] Some cracks | 116.8 ± 13.0 | 18.5 | 21.46 |

[a]No $T_m$s were seen for these materials.
[b]RT = room temperature; "±" indicates greatest difference between average and highest/lowest value.
[c]1% Secant; "yield" = sample yield observed on modulus test stress-strain curve; "cracks" = internal cracks/voids observed in used (broken) test bars.
[d]RT = room temperature; RN = reverse notch; FN = forward notch.
[e]Only one bar used for forward notch tests.
[f]Melt Flow Rate, analyzed as described in Comparative Example C4.
[g]To a lesser extent than C1 bars.
[h]Not measured.
[i]Greater variability in these samples may partially be due to variations in mold temperature; some samples exhibited thin spots (best value = 324.5 J/m).

Comparative Example C2

Preparation of Cyclic Olefin Copolymer/Non-Functionalized Plasticizer Blend Containing 10 wt % Plasticizer A Haake mixing procedure similar to Comparative Example C1 was carried out using 40.5 g of stabilized, powdered Topas™ 8007S-04 resin and 4.5 g SpectraSyn™ 10

Example C1 to give similarly appearing test bars. The mold temperature used during injection molding varied between 25 and 55° C. Results are given in Table 2.

The $T_g$ onset for this blend (21.1° C.) was approximately the same temperature as the test temperature (room temperature) for the flexural modulus and Izod impact data shown in Table 2. As a result, the Izod impact exhibited an apparent increase (enhancement) rather than a decrease. This is an artifact arising from self-plasticization of the cyclic olefin copolymer, which has partially transitioned through its $T_g$, as further evidenced by an extreme and uncharacteristic decrease in flexural modulus, a test stress-strain curve exhibiting yield, and the lack of observed test bar break or defects following modulus testing.

Comparative Example C4

Preparation of Control Cyclic Olefin Copolymer Resin Sample

A Haake mixing procedure similar to Comparative Example C1 was carried out using only 45 g of stabilized, powdered Topas™ 8007S-04 resin. No SpectraSyn™ 10 PAO was added. The resin/PAO mix was added to the mixer over a 2:37 min period. The resultant blend was injection molded and analyzed similarly to the material in Comparative Example C1 to give similarly appearing test bars. Injection molding was also carried out on pellets of commercial Topas™ 8007S-04 resin to give transparent bars with no brown tint. Results for both materials are given Table 2. Used Izod and modulus test bars of commercial Topas™ 8007S-04 resin were subsequently ground into a 2 mm mesh size powder and used for Melt Flow Rate (MFR) testing at 230° C. following ASTM D 1238 (Procedure B) using a Kayeness Polymer Test System Series 4000 (Model 4003) Melt Indexer with a 2.16 kg weight, assuming a melt density of 0.738 g/mL.

Comparative Example C5

Preparation of Cyclic Olefin Copolymer/PAO Blend Containing 15 wt % PAO Using Higher-$T_g$ Cyclic Olefin Copolymer This Comparative Example duplicates the procedure of Comparative Example C3 (addition of 15 wt % non-functionalized plasticizer) using a cyclic olefin copolymer resin of higher $T_g$. This was performed to confirm that the apparent "enhancement" in Izod impact seen for the 15 wt % blend of Comparative Example C3 was an artifact of its $T_g$ onset nearing the test temperature. As expected, the blend exhibited similar properties to the blends of Comparative Examples C1 and C2, such as a flexural modulus and Izod impact of the expected magnitude and visual evidence of increased brittleness (complete test bar break and internal cracks following modulus testing).

A Haake mixing procedure similar to Comparative Example C1 was carried out at 205° C. using 38.25 g of stabilized, powdered Topas™ 6013S-04 resin and 6.75 g SpectraSyn™ 10 PAO. The resin/PAO mix was added to the mixer over a 4:00 min period. The resultant blend was injection molded (mold temperature 25-29° C.) and analyzed similarly to the materials in Comparative Examples C1 and C4 to give similarly appearing test bars. Results are given in Table 2.

Comparative Example C6

Preparation of 80:20 Weight Ratio Cyclic Olefin Copolymer/Polymer Modifier Blend A Haake mixing procedure similar to Comparative Example C1 was carried out using 36.0 g of stabilized, powdered Topas 8007S-04 resin and 9.0 g of Vistalon™ 7001 rubber (pre-cut into 0.5 mm pieces). The Topas resin was added to the mixer at 30 rpm over a 3 minute period, and the rotor speed was then increased to 60 rpm for 1 minute. After reducing the rotor speed back to 30 rpm, the Vistalon™ 7001 was added over a 2 minute period and the rotor speed was again increased to 60 rpm for 1 minute. The mixture was then agitated at 30 rpm for another 3 minutes. The resultant blend was injection molded and analyzed similarly to the material in Comparative Example C1 to give opaque, off-white test bars (Izod impact testing was carried out at −18° C. rather than at room temperature). Results are given in Table 3.

Addition of the polymer modifier to the cyclic olefin copolymer resin did not significantly effect its $T_g$ (suggesting phase separation). The used test bars containing the modifier exhibited stress whitening and internal defects, unlike the used bars of the neat cyclic olefin copolymer resin.

TABLE 3

Effect of Non-Functionalized Plasticizer on a Cyclic Olefin Copolymer/Polymer Modifier Blend

| Ex. | Wt % Topas ™ 8007S-04 | Wt % Vistalon ™ 7001 | Wt % SpectraSyn ™ 10 | $T_g$ Midpt (° C.) (onset)[a] | RT Flex. mod.[b] (Kpsi) | Flex. mod. notes[c] | −18° C. Izod Impact (FN)[b] (J/m) |
|---|---|---|---|---|---|---|---|
| C4 | 100 | 0 | 0 | 76.6 (73.2) | 410.8 ± 3.4 | No break, yield, No cracks | —[d] |
| C6 | 80 | 20 | 0 | 75.6[e] (72.3) | 268.2 ± 3.6 | No break, minor stress crack/wht. | 38.9 ± 7.4 |
| 1 | 76 | 19 | 5 | 60.9 (58.1), −56.8 (−63.4) (weak) | 244.3 ± 3.6 | No break, no cracks, Stress whitening | 53.8 ± 11.1 |

[a]No $T_m$s were observed for these materials.
[b]1% Secant; RT = room temperature; "±" indicates greatest difference between average and highest/lowest value.
[c]"Cracks" (crk) = internal cracks/voids observed in used (broken) test bars; "wht" (stress whitening) = stress whitening near yield point.
[d]FN = forward notch.
[d]Not measured.
[e]$T_g$ of elastomeric modifier phase (predicted ~−42° C.) was too weak for observation.

Example 1

Preparation of Cyclic Olefin Copolymer/Polymer Modifier/Non-Functionalized Plasticizer Blend with an 80:20 Weight Ratio of Cyclic Olefin Copolymer:Polymer Modifier and Overall 5 wt % Plasticizer (76:19:5 Cyclic Olefin Copolymer:Modifier:Plasticizer)

A Haake mixing procedure similar to Comparative Example C6 was carried out using 34.2 g of stabilized, powdered Topas™ 8007S-04 resin, 8.55 g of Vistalon™ 7001 rubber, and 2.25 g of SpectraSyn™ 10 PAO. The pre-mixed Topas™ resin and SpectraSyn™ 10 (36.45 g) were added to the mixer at 30 rpm over a 3 minute period, and the rotor speed was then increased to 60 rpm for 1 minute. After reducing the rotor speed back to 30 rpm, the Vistalon™ 7001 was added over a 1 minute period and the rotor speed was again increased to 60 rpm for 1 minute. The mixture was then agitated at 30 rpm for another 4 minutes (10 minute total run time). The resultant blend was injection molded and analyzed similarly to the material in Comparative Example C6 to give test bars of similar appearance. Results are given in Table 3.

This three-component blend containing non-functionalized plasticizer showed a significant enhancement in low-temperature properties (higher −18° C. Izod impact) as compared to the two-component blend C6 lacking plasticizer. Visual evidence of reduced brittleness at room temperature (no internal defects in test bars after modulus testing) was also seen. The three-component blend exhibited two $T_g$s corresponding to apparent separate cyclic olefin copolymer and polymer modifier phases. Both were depressed from the $T_g$s of the neat components (and the $T_g$ seen for the two-component blend C6) towards the $T_g$ of the plasticizer (−85.0° C.). This suggests that the plasticizer enters both the cyclic olefin copolymer phase and the elastomeric polymer modifier phase. A broadening of $T_g$ of the cyclic olefin copolymer phase (as evidenced by a greater temperature difference between onset and midpoint) was not apparent as was observed in the cyclic olefin copolymer material C1 containing 5 wt % plasticizer.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A polymer composition comprising a blend comprising
   (a) about 76 wt % (based upon the weight of the composition) of an amorphous cyclic olefin polymer having a $T_g$ between 60° C. and 76.6° C. and having a $T_m$ heat of fusion ($\Delta H_f$) of 0.5 μg or less selected from the group consisting of:
   i) copolymers comprising at least one acyclic olefin and at least 20 mole °A, of one or more cyclic olefins;
   (b) about 19 wt % (based upon the weight of the composition) of an acyclic olefin polymer modifier having a glass transition temperature of less than −40° C.
   wherein said acyclic olefin polymer comprises an elastomeric olefin/nonconjugated diene copolymer comprising an ethylene component, a propylene component and a nonconjugated diene component selected from the group consisting of norbornene ethylidene norbornene (ENB) vinyl norbornene (VNB), and alkyl norbornene; and
   (c) about 5 wt % (based upon the weight of the composition) a non-functionalized plasticizer having a kinematic viscosity at 100° C. of 10 to 40 cSt, a viscosity index of 130 to 150, a pour point of −48° C. or less and a flash point of 230° C. or more
   wherein the non-functionalized plasticizer is a polyalphaolefin having an $M_n$ 300 to 500 g/mol, and the polyalplaolefin comprises oligomers of one or more alphaolefins selected from the group consisting of 1-hexene, 1-heptene, 1-octene, 1-nonene, and 1-decene, and blends thereof, and
   wherein the polymer composition has a −18° C. Izod Impact (forward notch) of from 42.7 to 64.9 J/m.

2. The composition of claim 1 wherein the amorphous cyclic olefin polymer is selected from the group consisting of: ethylene-norbornene copolymers; ethylene-norbornene-ethylidene norbornene terpolymers; and ethylene-norbornene-vinylnorbornene terpolymers.

3. The composition of claim 1 wherein the non-functionalized plasticizer has a specific gravity of 0.835 to 0.86.

4. The composition of claim 1 wherein the blend has a room temperature 1% secant flexural modulus of at least 1655 MPa.

5. The composition of claim 1 wherein the cyclic olefin polymer has a light transmittance of 89 or more.

6. An article of manufacture comprising the composition of claim 1.

* * * * *